US007105044B2

(12) United States Patent
Konishi et al.

(10) Patent No.: US 7,105,044 B2
(45) Date of Patent: Sep. 12, 2006

(54) FLUID TANK

(75) Inventors: Akiko Konishi, Kawasaki (JP); Shotaro Ishii, Kawasaki (JP); Kouji Chikaishi, Kawasaki (JP); Noboru Kanayama, Kawasaki (JP); Tatsuro Nohara, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 88 days.

(21) Appl. No.: 10/443,526

(22) Filed: May 21, 2003

(65) Prior Publication Data

US 2003/0233942 A1 Dec. 25, 2003

(30) Foreign Application Priority Data

May 22, 2002 (JP) ............................. 2002-147744
Jun. 28, 2002 (JP) ............................. 2002-191205
Jan. 8, 2003 (JP) ............................. 2003-002030

(51) Int. Cl.
*B01D 19/00* (2006.01)

(52) U.S. Cl. ............................ 96/208; 96/209; 96/211; 96/212; 96/216; 95/261; 210/188

(58) Field of Classification Search .................. 96/211, 96/212, 209, 216, 208; 95/261; 210/188
See application file for complete search history.

(56) References Cited

U.S. PATENT DOCUMENTS 2,316,729 A * 4/1943 Henry ......................... 96/212
2,418,231 A * 4/1947 Kimm et al. ............... 222/240
3,217,469 A * 11/1965 Eckert ......................... 96/211
3,397,512 A * 8/1968 Webb .......................... 96/211
3,452,518 A * 7/1969 Kjelland-Fosterud et al. . 96/216
3,844,743 A * 10/1974 Jones .......................... 96/184
4,039,305 A 8/1977 Livesay
4,541,850 A * 9/1985 Oda et al. ...................... 96/211
4,617,031 A * 10/1986 Suh et al. ...................... 95/243
4,865,632 A * 9/1989 Yano et al. .................... 96/212
4,878,924 A * 11/1989 Yano et al. .................... 96/212
5,202,026 A * 4/1993 Lema .......................... 96/189
5,755,965 A * 5/1998 Reiber ..................... 210/512.1
5,975,833 A 11/1999 Yamada et al.
6,134,816 A 10/2000 Murakami et al.
2002/0007736 A1* 1/2002 Hearn et al. .................. 96/209
2002/0056675 A1* 5/2002 Hegde ........................ 210/188
2002/0108486 A1 8/2002 Sannomiya
2003/0233942 A1 12/2003 Konishi et al.
2004/0148815 A1 8/2004 Chikaisha et al.
2004/0163865 A1 8/2004 Shimokakiuchi et al.

FOREIGN PATENT DOCUMENTS

JP 56-083602 7/1981
JP 56083602 A * 7/1981
JP 61-124701 6/1986
JP 61-124701 U 8/1988
JP 02-052013 2/1990

* cited by examiner

*Primary Examiner*—Duane Smith
*Assistant Examiner*—Douglas J. Theisen
(74) *Attorney, Agent, or Firm*—Frishauf, Holtz, Goodman & Chick, P.C.

(57) ABSTRACT

A fluid tank fluid is provided which includes a bubble removing device provided therein to remove bubbles from the fluid. The bubble removing device includes a cyclone chamber for generating a swirling current in the fluid flowing therethrough to separate bubbles from the fluid. At least one outflow port is provided through which the fluid from which the bubbles have been separated flows from the cyclone chamber. And an exhaust port is provided through which the bubbles separated from the fluid are driven from the cyclone chamber.

19 Claims, 14 Drawing Sheets

FLUID TANK

BACKGROUND OF THE INVENTION

1. Field of the Invention

The present invention relates to a fluid tank and, more particularly, it relates to a fluid tank provided with a bubble removing device for removing (air) bubbles in fluid.

2. Description of the Related Art

Many cylinders and other components of construction machines are normally driven by means of hydraulic fluid. Therefore, construction machines are mostly provided with hydraulic circuits for driving cylinders. Such hydraulic circuits comprise hydraulic tanks, pumps for feeding hydraulic fluid from working tacks under pressure, oil coolers for cooling hydraulic fluid and control valves and are often provided additionally with bubble removing devices for removing bubbles produced in the hydraulic circuit. If bubbles exist in hydraulic fluid, a phenomenon called cavitation can take place to damage the pump. Therefore, bubbles are removed from the hydraulic fluid that is being returned from the cylinder or some other component to the hydraulic tank by the bubble removing device. Then, hydraulic fluid that is free from bubbles is fed back by the pump, using pressure.

Various types of bubble removing device are known.

For example, firstly, there is a type called cyclone type (see, inter alia, Japanese Patent Application Laid-Open Publication No. 2-52013) that is adapted to generate a swirling current (vortex) in hydraulic fluid, drive bubbles having a small specific gravity toward the center and separate them by way of a dedicated flow path.

Secondly, there is a type that is also referred to as cyclone type but adapted not to separate bubbles from hydraulic fluid by way of a dedicated flow path. Instead, it is adapted to cause both bubbles and hydraulic fluid to flow into the hydraulic fluid stored in the hydraulic tank and drive off only bubbles having a small specific gravity upward along the wall surface of the bubble removing device (see, inter alia, Japanese Utility Model Application Laid-Open Publication No. 61-124701).

Thirdly, there is a type having a spiral flow path of hydraulic fluid that contains bubbles and adapted to expel bubbles as they are driven toward the center while hydraulic fluid is made to pass through the flow path (see inter alia, Japanese Patent Application Laid-Open Publication No. 56-83602).

However, all the above listed types are accompanied by problems specific to each of them.

Since a bubble removing device of the first type is arranged outside the hydraulic tank, it requires a large space dedicated to the hydraulic system because a bubble removing device has to be installed there in addition to a hydraulic tank and other facilities. Additionally, the bubble removing device has to be installed somewhere in the middle of the piping system and hence the installing operation will be a cumbersome and time consuming one.

In the case of using a bubble removing device of the second type, both bubbles and hydraulic fluid from which bubbles are expelled are forced to flow into the hydraulic fluid already stored in the tank. Therefore, if the hydraulic tank is rocked to a large extent as a result of a change to the posture of the construction machine, for instance, some or all of the bubbles that have been separated from hydraulic fluid can be mixed with the later to reduce the bubble removing effect of the device.

Finally, in the case of using a bubble removing device of the third type, since the flow path of hydraulic fluid that contain bubbles is realized to show a spiral form, the helix has to be made to show a large diameter so as to generate a sufficiently large centrifugal force and reliably expel bubbles. Then, the entire bubble removing device needs to have a large dimension in a radial direction of the helix so that consequently it requires a large space.

SUMMARY OF THE INVENTION

In view of the above identified circumstances, it is therefore an object of the present invention to provide a fluid tank that can reduce the space to be dedicated to a hydraulic system or the like and is adapted to allow an easy installing operation and reliably remove bubbles.

According to the invention, the above object is achieved by providing a fluid tank for containing fluid, the fluid tank comprising a bubble removing device arranged in the inside of the tank and adapted to remove bubbles contained in fluid, the bubble removing device having a cyclone chamber for generating a swirling current of bubble-containing fluid, an outflow port for causing the fluid made free from bubbles to flow out of the cyclone chamber and an exhaust port for allowing the bubbles separated from the fluid to be driven off from the cyclone chamber.

With a fluid tank according to the invention, since a bubble removing device is arranged in the inside of the fluid tank, unlike a fluid tank of the above described first type, it is not necessary to provide space for installing the bubble removing device in addition to the space for installing the fluid tank so that the space dedicated to the hydraulic system can be reduced. Additionally, since the bubble removing device can be installed in the fluid tank in advance and does not need to be installed somewhere in the middle of the piping system, the operation of installing the apparatus can be conducted effectively and quickly.

Since an outflow port for causing the fluid made free from bubbles to flow out an exhaust port for allowing the gas of bubbles to move out are provided separately from each other in a fluid tank according to the invention, the exhaust port can be drawn, if necessary, and arranged at a position that does not mix bubbles and fluid coming out of the outflow port even under rocking motions of the fluid tank. Therefore, if compared with fluid tank provided with a bubble removing device of the above identified second type, a fluid tank according to the invention can reliably remove bubbles without any risk of mixing bubbles with fluid.

Furthermore, since the bubble removing device has a structure of being provided with a cyclone chamber, it can be made to show a diameter smaller than the bubble removing device of the above identified third type having a helical fluid flow path. Thus, again, it is possible to reduce the dedicated space.

For the purpose of the present invention, it is preferable that guide sections for guiding the fluid made free from bubbles toward the delivery port or a strainer fitted to the delivery port (of the fluid tank) are provided in the inside of the tank.

Since the tank is provided with a guide section, the fluid caused to flow out of the cyclone chamber and made free from bubbles is driven to flow smoothly to the delivery port or the strainer fitted to the delivery port without mixing with released bubbles so that fluid that is free from bubbles is constantly driven to flow out from the delivery port.

For the purpose of the present invention, it is preferable that the guide sections cover at least the periphery of the outflow port and also a part of the strainer located close to the fluid surface.

With such a fluid tank, since the guide sections cover at least the periphery of the outflow port, the fluid that is made free from bubbles and flowing out of the outflow port fiercely is advantageously guided to the side of the strainer.

Meanwhile, in a system to which a fluid tank is connected, there are occasions where fluid is supplied from the hydraulic tank at a rate greater than the rate at which fluid is returned to the fluid tank by way of the bubble removing device. If such is the case, part of the fluid contained in the fluid tank is drawn in from the strainer to compensate the insufficient flow rate of fluid returning from the bubble removing device. Then, if the fluid intake position of the strainer is found close to the fluid surface, a vortex can occur at the surface to draw bubbles into the fluid. Therefore, in conventional fluid tanks, the fluid intake position of the strainer needs to be separated from the fluid surface by more than a certain distance.

To the contrary, in a fluid tank according to the invention, since the guide sections cover at least a part of the strainer located close to the fluid surface, the strainer draws in the fluid stored in the fluid tank in advance from a part remote from the fluid surface. Therefore, no vortex is generated at the fluid surface if the strainer draws in a large amount of fluid, so that good fluid that does not contain any bubbles is drawn in. Additionally, since it is no longer necessary to separate the fluid intake position of the strainer from the fluid surface by a certain distance unlike conventional fluid tanks, the volume of the fluid tank can be reduced and the fluid tank can be downsized.

For the purpose of the invention, it is preferable that the bubble removing device is arranged near (more preferably immediately above) the delivery port or near (more preferably immediately above) the strainer that is fitted to the delivery port.

Then, since the bubble removing device is arranged near the delivery port or the strainer that is fitted to the delivery port, the fluid that is made free from bubbles is driven to flow out from the cyclone chamber smoothly toward the delivery port or the strainer fitted to the delivery port. Thus, this arrangement provides advantages similar to those that are obtained by the above described arrangement of providing guide sections.

For the purpose of the invention, it is preferable that the bubble removing device is arranged immediately above the delivery port or immediately above the strainer fitted to the delivery port and immediately below the filter for filtering fluid containing bubbles.

In the case of a fluid tank having such an arrangement, the filter, the bubble removing device and the delivery port or the strainer are substantially vertically aligned, the fluid tank that also contains a filter can be downsized.

For the purpose of the invention, it is preferable that the cyclone chamber has a cylindrical peripheral surface section and an end facet section closing one of the ends of the peripheral surface section and a plurality of outflow ports are provided along the end facet section near the outer periphery thereof.

Generally, bubbles that have a small specific gravity gather at and near the center of the cyclone chamber. Therefore, if the fluid outflow port is arranged at a position close to the center of the end facet section, the momentum of flowing out fluid may surpass the buoyancy of bubbles so that bubbles may flow out not through the exhaust port but through the outflow port with fluid.

To the contrary, according to the invention, since a plurality of outflow ports are arranged along the end facet near the outer periphery of the latter, bubbles that gather at and near the center of the cyclone chamber hardly flow out through the outflow ports with hydraulic fluid so that it is no longer necessary to worry about bubbles flowing out of the fluid tank with fluid.

For the purpose of the invention, a momentum reducing section is provided in the tank in order to reduce the momentum of the fluid flowing out through the outflow port or ports.

If fluid flows out through the outflow port of the cyclone chamber with excessive momentum, the fluid surface can swell greatly and/or fluid can burst out upward like a fountain due to the excessive momentum. Then, waves can appear on the fluid surface to trap gas such as air on the fluid surface and generate bubbles. If the fluid surface moves up and down vehemently, the level of the fluid surface can partly fall remarkably. If gas is trapped at such a low level, the trapped gas can easily be driven to move out of the fluid tank as bubbles.

However, since the fluid tank according to the invention is provided with a momentum reducing section, the momentum of the flowing out fluid is reduced to make it difficult that waves appear on the fluid surface to trap gas. Thus, consequently bubbles can be reliably removed.

For the purpose of the invention, it is preferable that the exhaust port is exposed to the fluid contained in the fluid tank.

If the cyclone chamber is under negative pressure for some reason or another (and hence the pressure in the cyclone chamber is lower than the area where bubbles arc delivered), air in the area where bubbles are delivered can be drawn into the cyclone chamber through the exhaust port. Then, there can arise a problem that the bubble removing device for removing bubbles draws in bubbles.

To the contrary, with the bubble removing device according to the invention, only some of the gas (bubbles) existing in the fluid flow path extending from the cyclone chamber to the exhaust port flows back if the cyclone chamber is under negative pressure. Thus, the volume of gas that can be drawn back into the cyclone chamber is very small and the problem that bubbles flow back into the fluid in the fluid tank is practically eliminated. Particularly, the distance from the cyclone chamber to the exhaust port is made very short so that the gas flow in the flow path is effectively made very small when the bubble removing device is arranged in the fluid tank.

For the purpose of the invention, it is preferable that a bubble combining area section for combining a number of bubbles coming out of the cyclone chamber is provided at the exhaust gas flow path holding the cyclone chamber of the bubble removing device and the exhaust port for expelling bubbles in communication with each other.

With a fluid tank provided with such a bubble combining area section somewhere at the exhaust gas flow path, minute bubbles are combined to grow into large bubbles having large buoyancy. Then, large bubbles come up quickly from the exhaust port to the fluid surface so that they will hardly be sent out from the fluid tank with fluid to consequently further improve the bubble removing effect. While some large bubbles produced as a result of combining minute bubbles can directly come up to the fluid surface, others may be divided before coming up to the fluid surface. However, it has been confirmed that bubbles produced as a result of such divisions are remarkably greater than minute bubbles that are not combined so that they also come up to the fluid surface quickly.

For the purpose of the invention, it is preferable that a breather is provided in the fluid tank in order to maintain the pressure in the fluid tank substantially equal to the atmospheric pressure.

When a system to which a fluid tank is connected is installed at a high land where the atmospheric pressure is relatively low, the fluid intake section of the pump for drawing fluid from the fluid tank and supplying it to the system is apt to be under negative pressure. A phenomenon of cavitation can appear if that section is under negative pressure and the fluid that is drawn by the pump contains bubbles. In the case of a conventional fluid tank, the fluid intake section of the pump is prevented from being held under negative pressure by providing a pressurizing device.

To the contrary, with a fluid tank according to the invention, the pump operates properly without cavitation even at a high land where the atmospheric pressure is low because the bubble removing device effectively removes bubbles. Thus, unlike conventional fluid tanks, the provision of a pressurizing device is not necessary and hence the fluid tank does not need to have an enhanced strength to make it possible to reduce the cost of the fluid tank. Additionally, the fluid tank does not require space for installing a pressurizing device so that the system comprising the fluid tank can be made remarkably compact.

Furthermore, when a fluid tank according to the invention is provided with a breather, the air pressure inside the fluid tank is substantially held to a level equal to that of the atmospheric pressure. While the internal pressure of a conventional fluid tank is so regulated that it is found within a predetermined range by means of a pressurizing device, the breather takes the role of the pressurizing device in a fluid tank according to the invention that is free from a pressurizing device. Thus, the present invention makes it possible to realize a system that is simpler and more stable than any conventional system. Additionally, since the breather communicates with the atmosphere only when air needs to be taken in or exhausted, dusts or the like are prevented from entering the fluid tank.

DETAILED DESCRIPTION OF THE PREFERRED EMBODIMENTS

Figure 1:
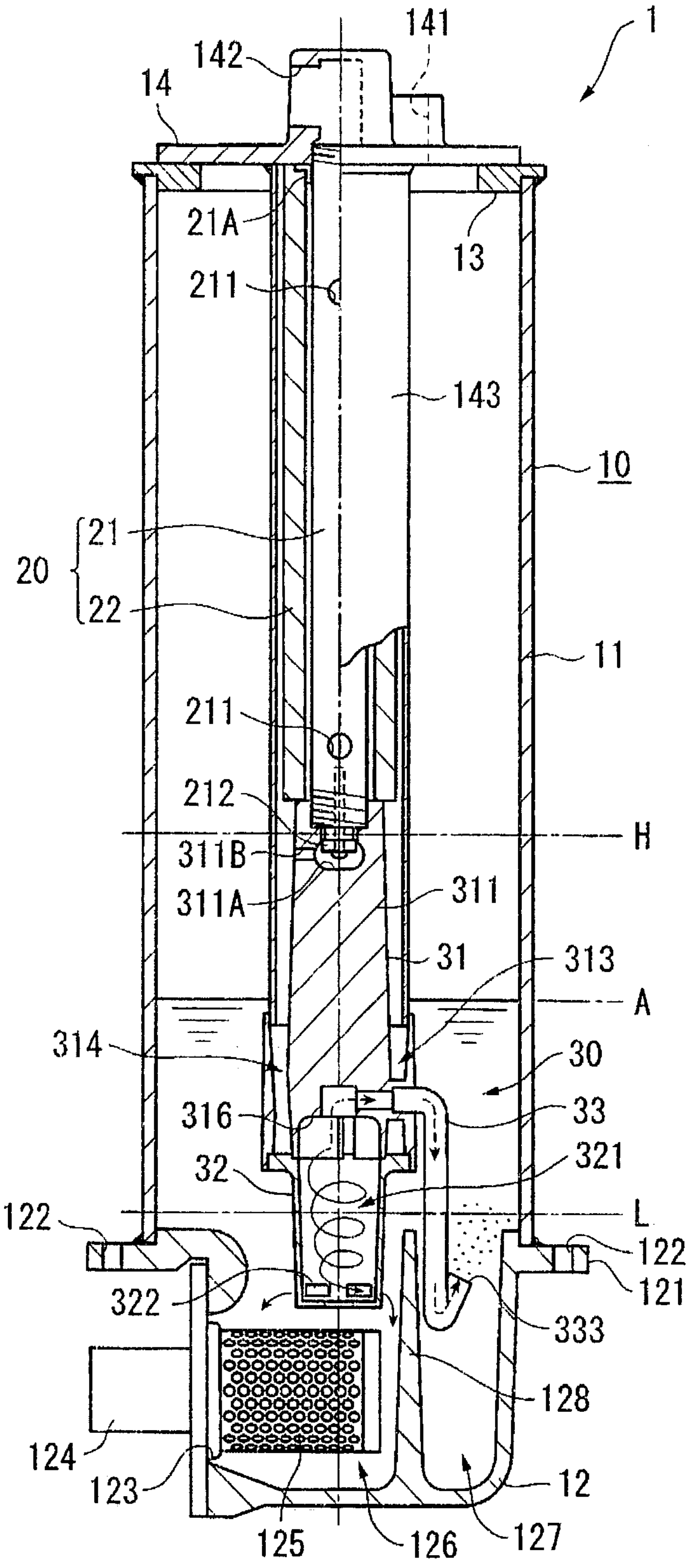
FIG. 1 is a schematic cross sectional front view of the first embodiment of fluid tank according to the invention.

Now, the present invention will be described in greater detail by referring to the accompanying drawings that illustrate preferred embodiments of the invention. In the drawings illustrating the second embodiment, the components that are the same as or similar to those of the first embodiment are denoted respectively by the same reference symbols and will not be described repeatedly.

[1st Embodiment]

Figure 2:
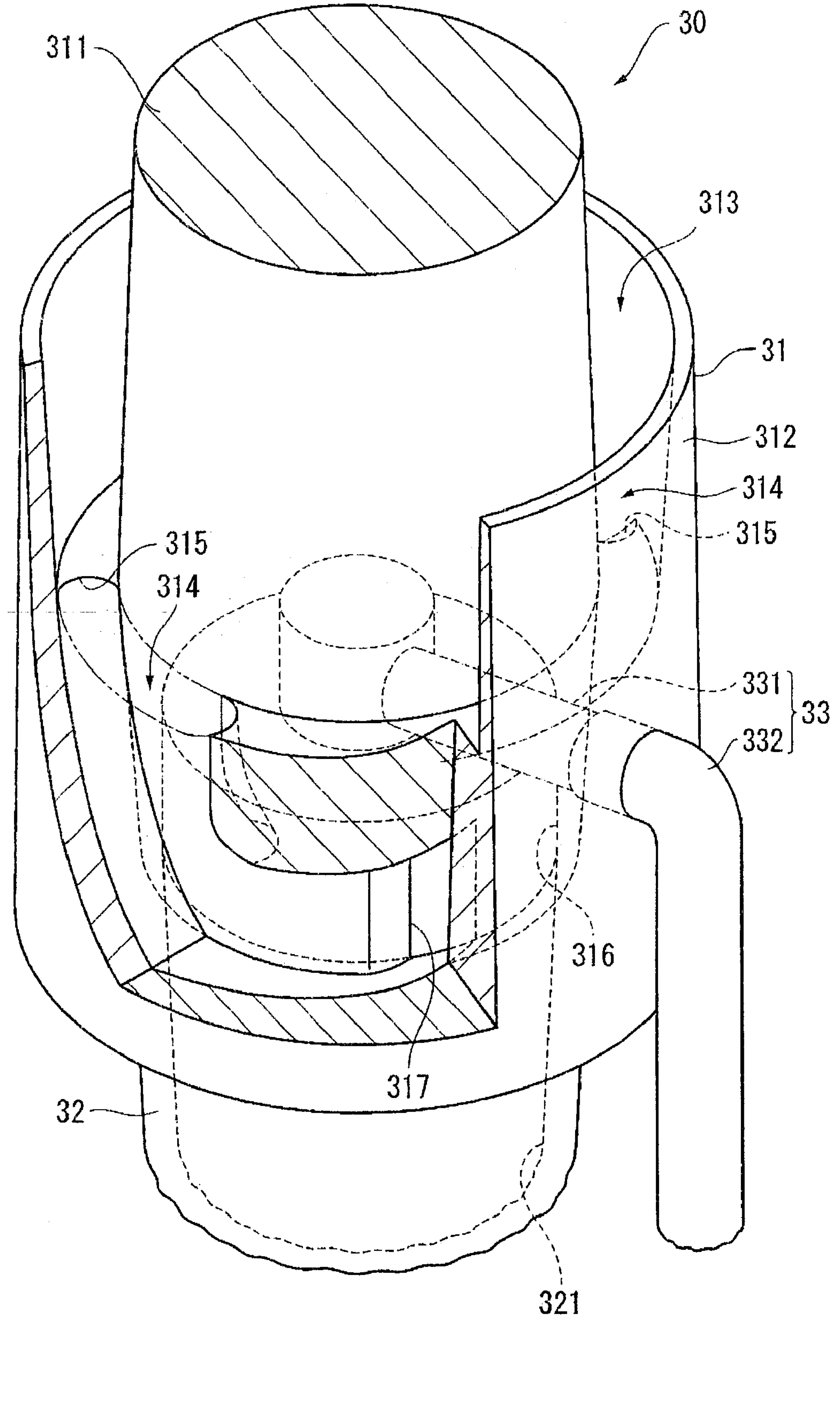
FIG. 2 is a schematic partial cross sectional perspective view of a principal part of the bubble removing device arranged in the fluid tank.

FIG. 1 is a schematic cross sectional front view of the first embodiment of hydraulic tank (fluid tank) 1 according to the invention and FIG. 2 is a schematic partial cross sectional perspective view of a principal part of the bubble removing device 30 arranged in the hydraulic tank 1 of FIG. 1.

The hydraulic tank 1 may typically be fitted to a construction machine so as to be used to contain hydraulic fluid (fluid) for driving the working equipment. In other words, the hydraulic tank 1 is connected to a control valve (not shown), a cylinder that operates as part of the working equipment, an oil cooler and so on as well as to a pump (not shown) by way of respective hydraulic fluid flow paths to establish a hydraulic circuit and a hydraulic system.

The hydraulic tank 1 comprises a tank main body 10, a filter 20 contained in the tank main body 10 and a bubble removing device 30 also contained in the tank main body 10, the filter 20 and the bubble removing device 30 being hanged down in the tank main body 10.

More specifically, the tank main body 10 has a hollow cylindrical body 11, an oil receiving member 12 rigidly secured to the lower end of the cylindrical body 11 by welding or the like, a flange 13 rigidly secured to the upper end of the cylindrical body 1 also by welding and a closure member 14 removably fitted to the flange 13 from above by means of bolts (not shown).

Of the above listed components, the oil receiving member 12 has an outer flange 121 that is provided with bolt receiving holes 122 for receiving bolts in order to secure the entire hydraulic tank 1 to the vehicle section and other parts of the construction machine. The oil receiving member 12 is provided at the lateral side thereof with a laterally directed delivery port 123 and a joint member 124 is secured to the delivery port 123 by means of bolts with sealing members (not shown) interposed between them. The joint member 124 is adapted to be connected to an external flow path. A suction strainer (to be referred to simply as strainer hereinafter) 125 is integrally fitted to the joint member 124 and contained in the oil receiving member 12.

The oil receiving member 12 has in the inside a feeding space 126 in which the strainer 125 is contained and a drain space 127 which is linked to a drain flow path (not shown) coming from a hydraulic device such as a hydraulic motor, the spaces 126, 127 being separated from each other by a guide section 128. Due to the provision of the guide section 128, hydraulic fluid mainly contained in the feeding space 126 is supplied to the hydraulic circuit by way of the strainer 125 and any of the hydraulic fluid returned to the drain space 127 is not directly supplied to the hydraulic circuit.

On the other hand, the closure member 14 is provided with an oil supply port 141 for supplying fresh hydraulic fluid and a return port 142 through which hydraulic fluid coming from the cylinder and other parts of the working equipment. A cylindrical vertical pipe 143 is rigidly secured to the lower surface of the closure member 14 typically by welding and the inside of the vertical pipe 143 and the return port 142 communicate with each other. The vertical pipe 143 is arranged in position with the filter 20 contained in an upper part of the inside thereof and part of the bubble removing device 30 contained at and near the lower end of the inside thereof.

The filter 20 includes a cylindrical core member 21 into which hydraulic fluid flows from the return port 142 and an element 22 for filtering hydraulic fluid coming from round hole 211 of the core member 21.

The upper end of the core member 21 is forcibly driven into the opening of the outlet side of the return port 142, while the lower end of the core member 21 is provided with a relief valve 212. When, for instance, the oil temperature is low or the oil flow rate of the filter 20 is high, the inlet side of the core member 21 shows high pressure. Then, hydraulic fluid flows out not from the round hole 211 but from the relief valve 212 downward without passing through the element 22.

The element 22 has a cylindrical profile and arranged so as to surround the core member 21. The element 22 is supported at the lower end thereof on the upper end of the bubble removing device 30 arranged immediately below it. The element 22 is pinched between the upper end of the bubble removing device 30 and an L-shaped bracket 21A arranged at or near the upper end of the core member 21.

The bubble removing device 30 has a guide member 31 for guiding the flow of hydraulic fluid that has passed through the filter 20, and a cup-shaped member 32 forcibly driven into the lower end of the guide member 31. The bubble removing device 30 is located immediately above the strainer 125 and fitted immediately below the filter 20. Thus, the filter 20, the bubble removing device 30 and the strainer 125 are vertically aligned in the above listed order.

The guide member 31 has a solid core section 311 that is located at a central part thereof and has an upwardly tapered substantially frusto-conical profile. The lower end of the core member 21 of the filter 20 is forcibly driven into the upper end of the solid core section 311. Thus, as described above, the element 22 of the filter 20 is supported on the upper end of the solid core section 311. The solid core section 311 is provided in an upper end part thereof with a containing section 311A for containing the relief valve 212. The hydraulic fluid flowing out to the relief valve 212 is then made to flow out to the outside of the solid core section 311 from the containing section 311A through a through hole 311B.

As shown in the enlarged view of FIG. 2, the guide member 31 is provided at the lower side thereof with a cylindrical section 312 that is surrounding the outer periphery of the solid core section 311. The inner peripheral surface of the cylindrical section 312 is downwardly tapered and the solid core section 311 is forcibly driven into the core member 21 while the upper edge part of the tapered surface is held in tight contact with a lower end part of the outer periphery of the vertical pipe 143.

The upper half of the cylindrical section 312 defines a gap 313 with the solid core section 311 by the inner surface thereof. The hydraulic fluid that has passed through the filter 20 flows into the gap 313. The hydraulic fluid that flows into the gap does not leak to the outside because of the above described tight contact of the cylindrical section 312 and the vertical pipe 143. On the other hand, the lower half of the cylindrical section 312 and the solid core section 311 do not basically form any gap between them but a pair of inlet flow paths 314 are arranged oppositely in a radial direction between them.

The inlet flow paths 314 have a role of holding the upper opening 315 of the gap 313 and the lower opening 317 arranged at a recessed section 316 disposed at the lower end of the solid core section 311 in communication with each other. The hydraulic fluid that flows in through the upper opening 315 makes about ¼ of a full turn along the outer periphery of the solid core section 311, while flowing downward, and becomes gradually converged before it flows into the recessed section 316 through the lower opening 317.

In the inside of the cup-shaped member 32, a cyclone chamber 321 is formed together with the recessed section 316 positioned upper part thereof. A lower end part of the cup-shaped member 32 is contained in the feeding space 126 of the oil receiving member 12 and a plurality of outflow ports 322 are arranged along the lower end of the peripheral surface of the cup-shaped member 32. More specifically, the cyclone chamber 321 formed by the cup-shaped member 32 includes a cylindrical peripheral surface section 321A and an end facet section 321B that closes the lower end of the peripheral surface section 321A and a plurality of outflow ports 322 (four in the case of this embodiment) are arranged at regular intervals along the lower end of the peripheral surface section 321A near the outer periphery of the end facet section 321B. When the cup-shaped member 32 having outflow ports 322 arranged at the peripheral surface section 321A is replaced with a bottomless cylindrical member, the lower opening of the member may be used as outflow port.

Figure 3:
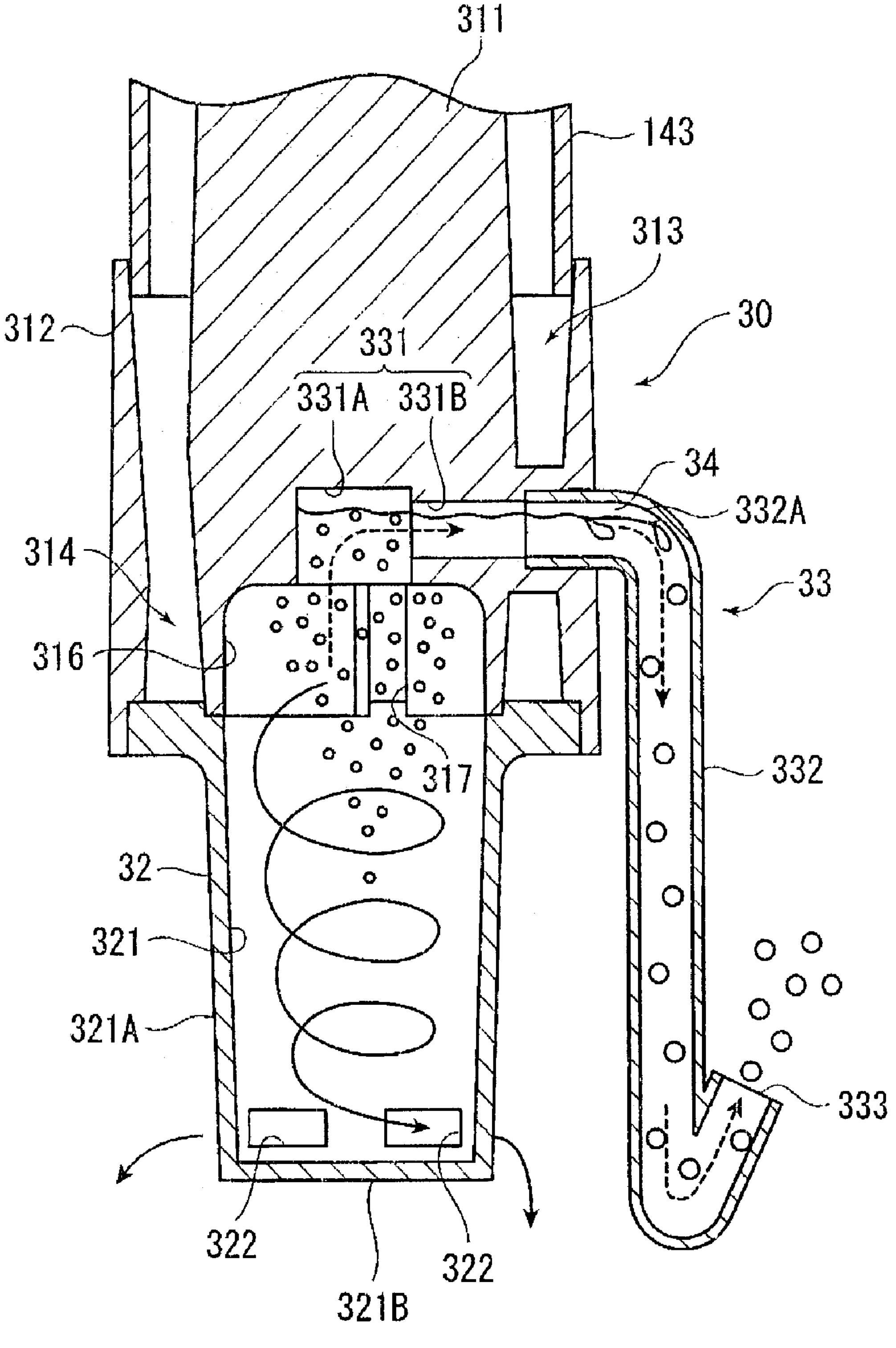
FIG. 3 is a schematic cross sectional view of the bubble removing device of the first embodiment.

The hydraulic fluid that flows to the recessed section 316 tangentially relative to the latter from the lower opening 317 is directed downward, while forming a swirling current in the cyclone chamber 321, and flows out into the feeding space 126 through the outflow ports 322 (see the helical arrow in FIG. 3). The hydraulic fluid flows well tangentially relative to the cyclone chamber 321 in a considerably vigorous manner but is smoothly taken into the strainer 125 and fed back to the fluid tank because the strainer 125 is arranged immediately below and the spreading tendency of the hydraulic fluid is suppressed by the guide section 128 so that the hydraulic fluid is led toward the strainer 125.

If the hydraulic fluid that has passed through the filter 20 contains bubbles, bubbles whose specific gravity is much smaller than that of hydraulic fluid gather at the center top of the hydraulic fluid in the cyclone chamber 321 where a swirling current is generated and expelled through an exhaust flow path 33 under the internal pressure of the cyclone chamber 321 (see the broken arrows in FIG. 3).

The exhaust flow path 33 is arranged to communicate the recessed section 316 and the drain space 127 of the oil receiving member 12. It includes an internal flow path 331 extending horizontally from an upper part of the recessed section 316 to the cylindrical section 312 and an external flow path 332 which is typically made of a tube fitted to the internal flow path 331. The external flow path 332 is bent and directed downward but its front end part is bent again and directed upward. The front end of the external flow path 332 ends with an exhaust port 333 located in the hydraulic fluid remaining in the drain space 127.

Thus, the bubble removing device 30 is provided with outflow ports 322 through which hydraulic fluid that is made free from bubbles flows out and also with an exhaust port 333 for exhausting bubbles. Additionally, since the exhaust port 333 is located in the hydraulic fluid remaining in the drain space 127, gas that is found above the level of the surface of the hydraulic fluid in the fluid tank does not flow back through the exhaust port 333 if negative pressure prevails in the cyclone chamber 321. Thus, in this embodiment, the exhaust port 333 located in the hydraulic fluid operates as an anti-backflow section for preventing gas from flowing back.

As illustrated in FIG. 3 with enlarged dimensions, since the exhaust port 333 is located in the hydraulic fluid in this embodiment, hydraulic fluid is found with bubbles in the exhaust flow path 33. However, an upper part of the exit port 331A for bubbles that forms part of the internal flow path 331, an upper part of horizontal hole section 331B that also forms part of the internal flow path 331 and an upper part of horizontal section 332A that forms a base end of the external flow path 322 collectively operate as bubble combining area section 34 where small bubbles from the cyclone chamber 321 are combined to grow into large bubbles and the grown up large bubbles are pooled. Thus, small bubbles from the cyclone chamber 321 are combined with grown up large bubbles and subsequently large bubbles are driven out of the bubble pool by the flow of hydraulic fluid in the exhaust flow path 33 and expelled from the exhaust port 33. When large bubbles are driven out of the bubble pool, they have grown up to very large bubbles so that they go up very quickly from the exhaust port 333 to the hydraulic fluid surface.

The level A of the fluid surface in the hydraulic tank 1 having the above described configuration and shown in FIG. 1 indicates that the cylinder or the like of the working equipment is located at a certain position. On the other hand, the level L of the fluid surface in FIG. 1 indicates the lowest level that can appear when a large volume of hydraulic fluid is supplied from the hydraulic tank 1 to the cylinder bottom side. Finally, the level H of the fluid surface in FIG. 1 indicates the highest level that can appear when a large volume of hydraulic fluid is returned to the hydraulic tank 1 from the cylinder bottom side.

As may be clear from FIG. 1, the outflow ports 322 of the bubble removing device 30 and the exhaust ports 333 of the exhaust flow path 33 are located below the lowest fluid surface level L so that they can be constantly exposed to the hydraulic fluid contained in the hydraulic tank 1.

The flow of hydraulic fluid when the hydraulic tank 1 is in operation will be summarized below. Firstly, as the pump is operated, hydraulic fluid is fed out from the feeding space 126 of hydraulic tank 1 through the strainer 125 and returned to the upper return port 142 after circulating through the hydraulic circuit that includes a working equipment provided with a cylinder. The returned hydraulic fluid may contain bubbles to a large extent particularly when bubbles are produced from the cylinder.

Therefore, hydraulic fluid containing bubbles is made to pass through the filter 20 and flow down into the guide member 31 of the bubble removing device 30. The hydraulic fluid that flows into the guide member 31 flows tangentially into the cyclone chamber 321 and produces a swirling current in the cyclone chamber 321. The inflow of hydraulic fluid is very smooth because hydraulic fluid is made to flow through a pair of lower openings 317 that are oppositely disposed in a radial direction so that the swirling current is produced vigorously and effectively in the cyclone chamber 321. Due to the swirling current, bubbles gather at the center top of the hydraulic fluid in the cyclone chamber 321 and driven into the hydraulic fluid remaining in the drain space 127 through the exhaust flow path 33. The bubbles driven into the hydraulic fluid then go up toward the fluid surface and mix with the gas in the hydraulic tank 1. On the other hand, the hydraulic fluid from which bubbles are expelled is made to flow into the feeding space 126 through the outflow ports 322 and then sent out from the strainer 125 located immediately below.

When the cylinder piston is moved to the head side so that a large volume of hydraulic fluid is required and the requirement is not met by simply feeding back the hydraulic fluid coming out from the bubble removing device 30, some of the hydraulic fluid stored in the hydraulic tank 1 from before also needs to be supplied. Then, the fluid surface in the hydraulic tank 1 may fall to the level L. On the other hand, when the piston is moved to the bottom side so that only a small amount of hydraulic fluid is supplied from the hydraulic tank 1, all of the hydraulic fluid coming out from the bubble removing device 30 is not fed back and the remaining hydraulic fluid is stored, if temporarily, in the hydraulic tank 1. Then, the fluid surface in the hydraulic tank 1 may rise to the level H.

When, the element 22 of the filter 20 of the hydraulic tank 1 needs to be replaced, the closure member 14 is removed and subsequently the bubble removing device 30 is turned to disengage the core member 21 of the filter 20 and the closure member 14. Then, the bubble removing device 30 is removed from the vertical pipe 143 with the filter 20 in it. Thereafter, the bubble removing device 30 is turned again and the core member 21 is taken out from the bubble removing device 30. Finally, the filter 20 is pulled out of the core member 21 and a replacement put into position. The above procedure is followed inversely to reassemble the hydraulic tank 1.

When removing the bubble removing device 30 from the closure member 14 with the filter 20 in it, the core member 21 is released from the closure member 14 simply by turning the bubble removing device 30. However, the bubble removing device 30 would not be separated from the core member 21 until it is turned to release the core member 21 from the closure member 14.

The above described embodiment provides the following advantages.

(1) Since a bubble removing device 30 is arranged in the inside of the hydraulic tank 1, it is not necessary to secure any external space for the bubble removing device 30 outside the space for the hydraulic tank 1. Therefore, the space dedicated to the entire hydraulic system can be reduced and the construction machine can be downsized accordingly.

(2) It is not necessary to install a bubble removing device 30 separately somewhere on the piping of the hydraulic fluid flow paths because the bubble removing device 30 is fitted to the inside of the hydraulic tank 1 in advance. Therefore, the operation of installing the device is simple and can be conducted quickly.

(3) Since the bubble removing device 30 is provided with outflow ports 322 for causing hydraulic fluid from which bubbles are removed to flow out and an exhaust port 333 for exhausting bubbles separately, the exhaust port 333 can be arranged not in the feeding space 126 but in the drain space 127 separated from the feeding space 126. Thus, if the construction machine is inclined and consequently the hydraulic tank 1 is rocked fiercely, bubbles would not be mixed with the hydraulic fluid coming out from the device 30 and can be removed reliably.

Since the exhaust port 333 is directed upward, bubbles are expelled effectively and driven to the fluid surface quickly and smoothly.

(4) The bubble removing device 30 is additionally provided with a cyclone chamber 321 for producing a swirling current of hydraulic fluid. Therefore, the device 30 can be downsized to further reduce space dedicated to the hydraulic system if compared with known bubble removing devices having a helical flow path through which hydraulic fluid is made to flow to separate bubbles.

(5) The guide member 128 of the oil receiving member 12 has a function of not only separating the feeding space 126 and the drain space 127 as partition but also guiding the fluid coming out from the cyclone chamber 321 and made free from bubbles to flow toward the strainer 125 without mixing it with exhausted bubbles. Thus, high quality hydraulic fluid that does not contain bubbles is constantly, reliably and smoothly fed out from the delivery port 123.

(6) Since the bubble removing device 30 is arranged near (preferably immediately above) the strainer 125, the hydraulic fluid coming out from the cyclone chamber 321 that is made free from bubbles can smoothly flow toward the strainer 125.

(7) Since the fitter 20, the bubble removing device 30 and the strainer 125 are substantially vertically aligned in the hydraulic tank 1, the hydraulic tank 1 containing them can be reliably downsized.

(8) The bubble removing device 30 is not provided with an anti-backflow section at the side of the outflow ports 322 of hydraulic fluid. Instead, the exhaust port 333 arranged at the side of the exhaust flow path 33 of the bubbles operates as an anti-backflow section that suppresses gas flow flowing back into the cyclone chamber 321. Therefore, hydraulic fluid can be made to flow smoothly from the outflow ports 322 without using one or more chokes and the cyclone chamber 321 is prevented from generating high back pressure in the inside. Thus, the hydraulic system can effectively suppress any pressure loss without remarkable pressure rising in the system. Additionally, it is possible to use a small pump, an oil cooler and the like. Furthermore, the fuel consumption rate can be reduced when the system is operating and the manufacturing cost can also be reduced. Thus, the present invention can realize a power saving construction machine at reduced cost.

(9) Since the exhaust port 333 for bubbles is arranged in the hydraulic fluid of the hydraulic tank 1, it operates as an anti-backflow section. Therefore, it is no longer necessary to install a large anti-backflow section so that the peripherals of the cyclone chamber 321 and the hydraulic tank 1 itself can be downsized to further reduce the space dedicated to the hydraulic system.

(10) If the inside of the cyclone chamber 321 is under negative pressure, only some of the gas (bubbles) existing in the exhaust flow path 33 flows back into it. In other words, the volume of gas that flows back can reliably be reduced so that bubbles are prevented from being mixed again with the hydraulic fluid of the system.

(11) Particularly, in this embodiment where the bubble removing device 30 is arranged in the hydraulic tank 1, the distance of the exhaust flow path 33 from the cyclone chamber 321 to the exhaust port 333 is minimized to effectively minimize the volume of gas in the exhaust flow path 33.

(12) A bubble combining area section 34 is provided in the exhaust flow path 33 of the bubble removing device 30 so as to combine small bubbles coming from the cyclone chamber 321 to produce large bubbles that are temporarily held in a bubble pool and eventually expelled from the bubble pool. Thus, large bubbles showing large buoyancy can quickly come up to the fluid surface and would not be fed out from the hydraulic tank 1 with hydraulic fluid to further improve the bubble removing effect of the bubble removing device.

(13) The plurality of outflow ports 322 for flowing hydraulic fluid that is made free from bubbles from the cyclone chamber 321 are arranged peripherally along and near the outer periphery of the end facet section 321B that operates as the bottom of the cyclone chamber 321. With this arrangement, bubbles gathering at the center of the cyclone chamber 321 are prevented from flowing out through the outflow ports 322 with hydraulic fluid. In other words, bubbles are reliably prevented from flowing directly toward the strainer 125.

[2nd Embodiment]

Figure 4:
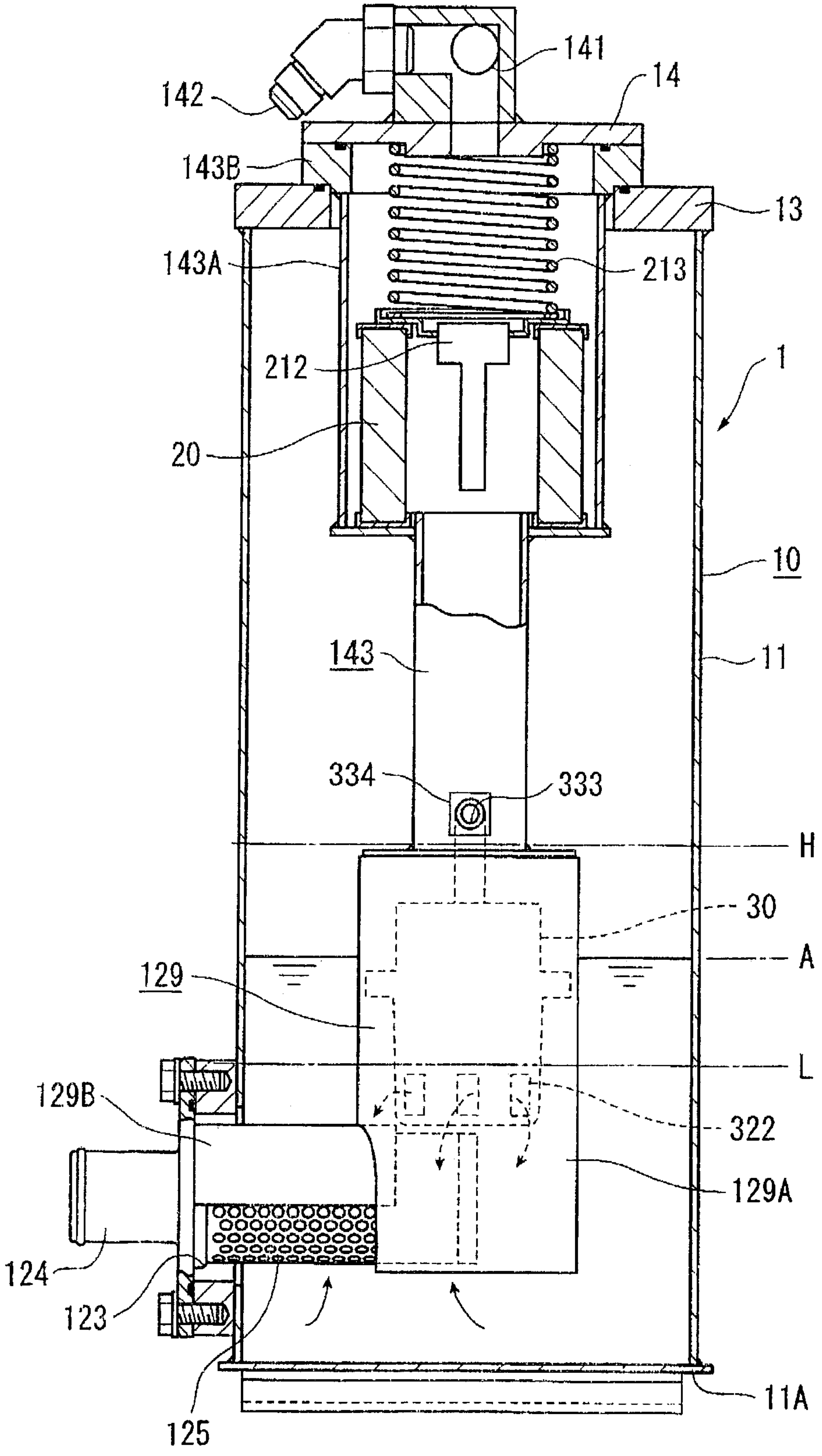
FIG. 4 is a schematic cross sectional front view of the second embodiment of fluid tank according to the invention.
Figure 5:
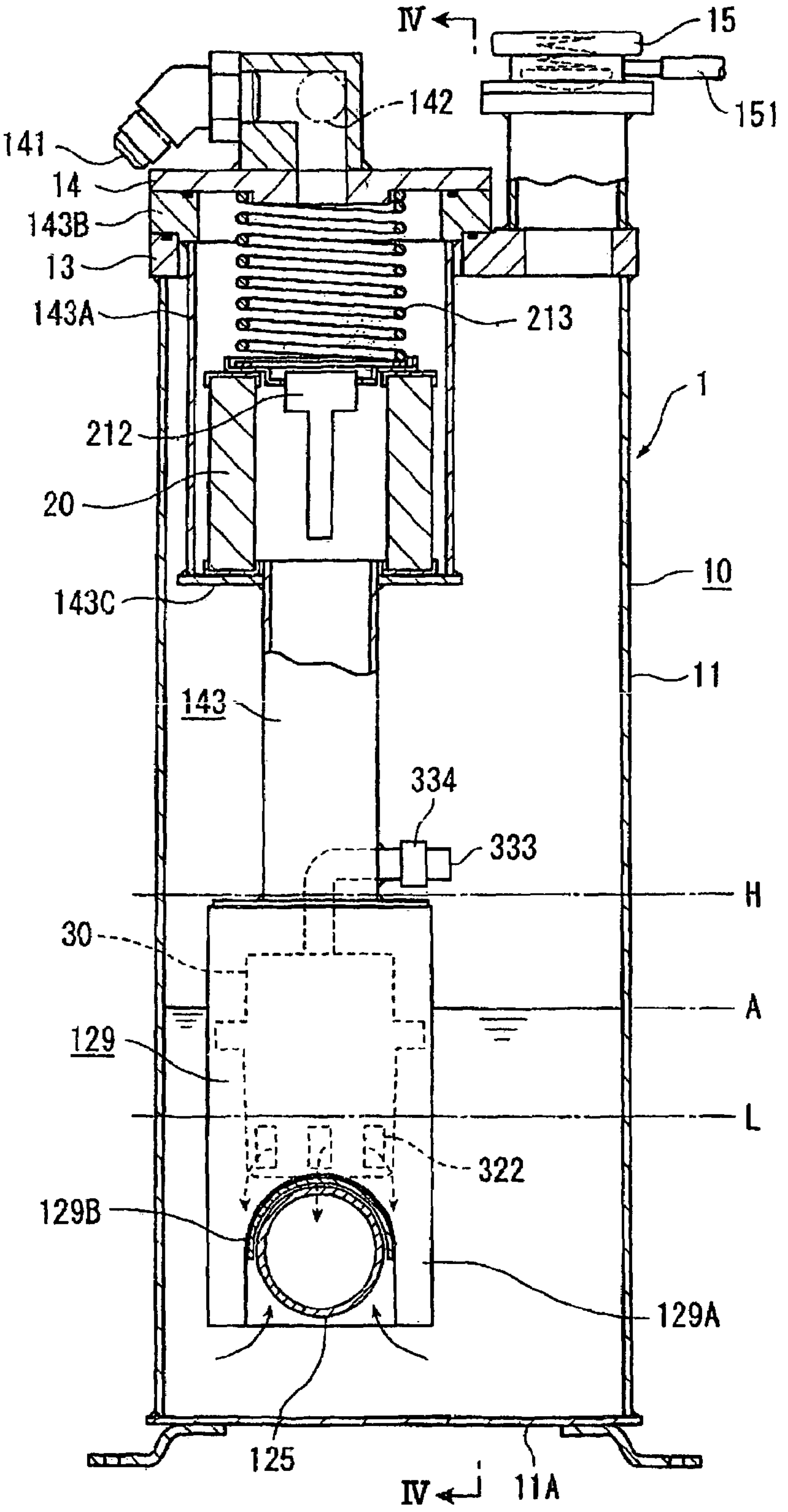
FIG. 5 is a schematic cross sectional lateral view of the second embodiment of fluid tank according to the invention.

Now, the second embodiment of the invention will be described. The second embodiment differs from the first embodiment in that the guide section 128 is made to show a profile different from that of its counterpart of the first embodiment and a breather is fitted to the hydraulic tank 1. FIG. 4 is a schematic cross sectional front view of the second embodiment of hydraulic tank 1 according to the invention. FIG. 5 is a schematic cross sectional lateral view of the second embodiment. Note that FIG. 4 shows a cross sectional view taken along line IV—IV in FIG. 5.

As shown in FIG. 4, a bottom plate 11A having a disk-shaped simple profile is fitted to the lower end of the cylindrical column body 11 of tank main body 10 typically by welding. Hydraulic fluid is contained in the inside of the tank main body 10. The cylindrical body 11 is provided at a lower part of the lateral side thereof with a delivery port 123, which is laterally open. A strainer 125 and a joint member 124 are fitted to the delivery port 123.

While the column body 11 is cylindrical as described above and hence has a circular cross section, it may alternatively have a polygonal, elliptic or some other appropriate cross section. However, a column body 11 having a cylindrical cross section shows a large physical strength. Therefore, it is possible to reduce the wall thickness of the tank main body 10 and eliminate the use of reinforcement that has hitherto been indispensable. As a result, the tank main body 10 can be manufactured at low cost.

A bottomed cylindrical filter containing section 143A having a diameter greater than that of the vertical pipe 143 is arranged above the vertical pipe 143. An upper end part of the vertical pipe 143 is made to run through and rigidly secured to the bottom of the filter containing section 143A so as to make them integral relative to each other. Thus, the inside of the filter containing section 143A and that of the vertical pipe 143 communicate with each other. A flange section 143B is integrally fitted to the upper end of the filter containing section 143A and held in engagement with the inside of the flange 13 of the tank main body 10. The flange section 143B is arranged between the flange 13 and the closure member 14 with sealing members interposed between them and rigidly secured to them by means of bolts (not shown) driven from above the closure member 14. Thus, the return port 142 communicates with the filter containing section 143A and the vertical pipe 143.

A cylindrically-shaped filter 20 is arranged in the inside of the filter containing section 143A. The bottom end of the filter 20 is placed on the bottom plane of the filter containing section 143A and the lower end of spring 213 is held to abut the top end of the filter 20. The upper end of the spring 213 abuts the closure member 14. In other words, the spring 213 urges the filter 20 toward the bottom of the filter containing section 143A with predetermined resilient force thereof.

The filter 20 has a hollow section whose top end is closed by a relief valve 212 contained in the filter 20. The relief valve 212 has a valve and a spring (not shown) so that the valve is urged with predetermined resilient force.

Unlike the first embodiment, the filter containing section 143A is provided as a member separate from the closure member 14. With this arrangement, the filter 20 can be replaced simply by removing the closure member 14.

As shown in FIGS. 4 and 5, a guide section 129 is provided in this embodiment so as to cover the periphery of the bubble removing device 30 and a part of the strainer 125 located close to the fluid surface. The guide section 129 has a cylindrical cyclone side guide 129A covering the peripheral area of the outflow ports 322 and a strainer side guide 129B covering an upper part of the strainer 125.

The cyclone side guide 129A is rigidly secured at the upper end thereof to the vertical pipe 143 by means of bolts (not shown) and entirely covers the bubble removing device 30. The cyclone side guide 129A also covers a part of the strainer 125 arranged immediately below the bubble removing device 30.

On the other hand, the strainer side guide 129B is rigidly secured at an end thereof to a joint member 124. The other end of the guide 129B is located in the inside of the cyclone side guide 129A.

In this embodiment, the exhaust port 333 of the bubble removing device 30 is located at a position higher than the surface of the hydraulic fluid in the hydraulic tank 1 so that it is constantly exposed to air. An anti-backflow section 334 such as check valve for preventing gas from flowing back into the bubble removing device 30 is arranged at the front end side of the exhaust port 333. The anti-backflow section 334 prevents gas from flowing back through the exhaust port 333 if negative pressure (lower than the pressure of the destination of exhausted gas) prevails in the cyclone chamber 321. As a result, bubbles are prevented from entering and being mixed with the hydraulic fluid in the cyclone chamber 321 from which bubbles has been removed.

As shown in FIG. 5, the tank main body 10 is provided with a breather 15, which maintains the as pressure in the hydraulic tank 1 to be substantially equal to the atmospheric pressure. The breather 15 has a pipe 151 open to the atmosphere and hence the inside of the hydraulic tank 1 can communicate with the atmosphere. The breather 15 is provided in the inside thereof with a pair of valves that can open and close the path connecting the inside of the hydraulic tank 1 and the atmosphere. The valves are urged typically by means of a spring so as to allow the hydraulic tank 1 to communicate with the pipe 151 when the pressure difference between the atmosphere and the internal pressure of the hydraulic tank 1 exceeds a predetermined threshold value. A valve opening pressure and a valve closing pressure are defined for each of the valves. When the internal pressure of the hydraulic tank 1 reaches the preset pressure of one of the valves, the other valve is opened to expel gas from the inside of the hydraulic tank 1. When the internal pressure of the hydraulic tank 1 falls to the present pressure of the other valve, the valve is opened to allow outer air to get into the hydraulic tank 1.

With the above described hydraulic tank 1, the hydraulic fluid that has returned from the return port 142 flows into the inside of the filter containing section 143A and moves through the filter 20 from the outer periphery to the inner periphery thereof for filtration before it flows into the vertical pipe 143. Thereafter, bubbles are removed from the hydraulic fluid by the bubble removing device 30 as in the case of the first embodiment. The bubbles removed from the hydraulic fluid are expelled into the gas in the hydraulic tank 1 by way of the anti-backflow section 334 and the exhaust port 333. On the other hand, the hydraulic fluid from which bubbles have been removed flows vigorously from the outflow ports 322 as indicated by broken line arrows in FIGS. 4 and 5. Then, it is led to the strainer 125 by the cyclone side guide 129A and fed back to the hydraulic circuit. If the internal pressure of the filter containing section 143A rises above a predetermined level for some reason or another, the relief valve 212 is opened. As a result, hydraulic fluid flows from the inside of the filter containing section 142A to the vertical pipe 143, bypassing the filter 20.

When a large volume of hydraulic fluid is required as a result of certain operation of the cylinder of the hydraulic circuit and the requirement is not met by simply feeding back the hydraulic fluid coming out from the bubble removing device 30, some of the hydraulic fluid stored in the hydraulic tank 1 from before also needs to be supplied. Then, hydraulic fluid flows into the strainer 125 from the side where the guide section 129 is not arranged, that is, the lower side remote from the fluid surface as shown by solid line arrows in FIGS. 4 and 5. Then, the surface of the hydraulic fluid in the hydraulic tank 1 may fall to the level L. If, on the other hand, only a small volume of hydraulic fluid is required, the hydraulic fluid returned from the return port 142 goes back into the hydraulic tank 1 by way of the bubble removing device 30. Then, the surface of the hydraulic fluid may rise to the level H.

Unlike conventional fluid tanks, the hydraulic tank 1 of this embodiment is not provided with a pressurizing device so that the internal pressure of the hydraulic tank 1 is regulated by means of the breather 15. When the fluid surface in the hydraulic tank 1 rises toward the level H to increase the internal pressure of the hydraulic tank 1, one of the valves in the inside of the breather 15 is opened to hold the hydraulic tank 1 and the pipe 151 in communication with each other in order to discharge air into the atmosphere. When, to the contrary, the fluid surface in the hydraulic tank 1 falls toward the level L to decrease the internal pressure of the hydraulic tank 1, the other valve in the inside of the breather 15 is opened in order to draw air into the hydraulic tank 1 from the pipe 151.

Thus, the second embodiment of the invention provides the following advantages in addition to those of (1), (2), (4), (6), (7), (8), (11) and (13) described above by referring to the first embodiment.

(14) Since the cyclone side guide 129A is arranged around the outflow ports 322 and the strainer side guide 129B is located close to the fluid surface of the strainer 125, the hydraulic fluid that is made free from bubbles is directly guided to the strainer 125. Therefore, it is possible to effectively supply hydraulic fluid of good quality to the hydraulic circuit.

Further, the strainer side guide 129B is arranged to cover a part thereof located close to the fluid surface if the fluid surface in the hydraulic tank 1 falls toward the level L, hydraulic fluid is supplied to the strainer 125 only from below. Therefore, if the strainer 125 draws in a large volume of hydraulic fluid, a vortex is prevented from appearing at the fluid surface. Thus, bubbles would not be mixed with the hydraulic fluid in the strainer 125 by any vortex, it is possible to constantly supply hydraulic fluid of good quality to the pump under any circumstances.

(15) Since vortex can be prevented from appearing by the strainer side guide 129B, the level of the surface of the hydraulic fluid in the hydraulic tank 1 can be held low. In other words, the hydraulic tank 1 can be downsized.

(16) Since bubbles can reliably be removed by the bubble removing device 30, the pump can be protected against the phenomenon of cavitation even in a working environment where negative pressure can easily occur at the inlet port of the pump such as that of a high land area where the atmospheric pressure is low. This means that the pump is protected against damages. Additionally, this arrangement does not require the use of a pressurizing device that has hitherto been indispensable so that it is possible to reduce the space necessary for the entire hydraulic circuit system. Furthermore, the hydraulic tank 1 does not require any particular physical strength so that it can be manufactured at low cost.

(17) Since the hydraulic tank 1 is provided with a breather 15, the internal pressure of the hydraulic tank 1 can be regulated and held at or near the level of the atmospheric pressure. In other words, if the level of the fluid surface in the hydraulic tank 1 moves up and down as hydraulic fluid is driven out from or fed into it, the fluctuations of the air pressure in the hydraulic tank 1 can be held within a predetermined range. More specifically, if the fluid surface in the hydraulic tank 1 falls to the level L, negative pressure of air is prevented from appearing in the hydraulic tank 1 so that hydraulic fluid can be supplied reliably to the pump. If, on the other hand, the fluid surface in the hydraulic tank 1 rises to the level H, the air pressure in the hydraulic tank 1 is prevented from becoming excessively high so that the hydraulic tank 1 is protected against damages and its service life is prevented from being curtailed. In other words, while conventionally a large pressurizing device has to be used to regulate the internal air pressure of the hydraulic tank, this embodiment can achieve the same objective of regulating the internal air pressure by using a breather 15 that is fitted to the hydraulic tank to simplify the overall configuration.

Additionally, the valves are opened and closed to draw or exhaust gas only when necessary so that dirt and dust can be prevented from entering the hydraulic tank 1. This is a particularly effective advantage when the hydraulic tank 1 is used with a construction machine or the like in an unfriendly outdoor environment.

(18) Since a flange section 143B is held in engagement with the flange 13 and rigidly secured to the closure member 14 by means of bolts that are driven from above, it is only necessary to open the closure member 14 for replacing the filter 20. In other words, it is no longer necessary to remove the vertical pipe 143 to which the bubble removing device 30 is fitted so that the filter 20 can be replaced with ease.

[3rd Embodiment]

Now, the third embodiment of the invention will be described below. This third embodiment differs from the first and second embodiments in terms of the direction of the strainer 125. Additionally, this embodiment does not comprise any members that correspond to the guide sections 128, 129 of the first and second embodiments. Instead, the bubble removing device 30 is provided with a momentum reducing section 75, although it may alternatively be provided with both guide members 128, 129 and a momentum reducing section 75.

Figure 6:
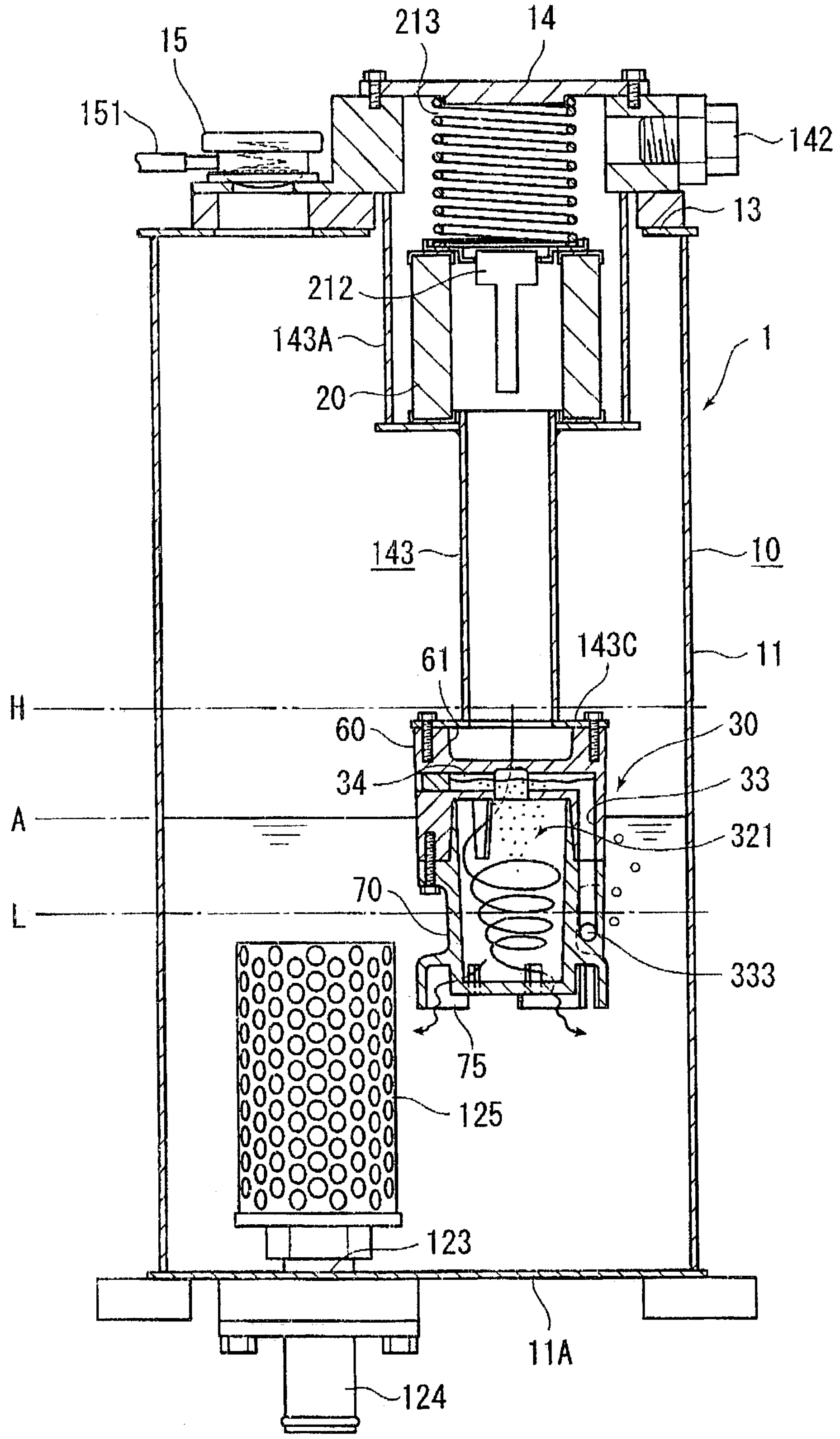
FIG. 6 is a schematic cross sectional front view of the third embodiment of fluid tank according to the invention.
Figure 7:
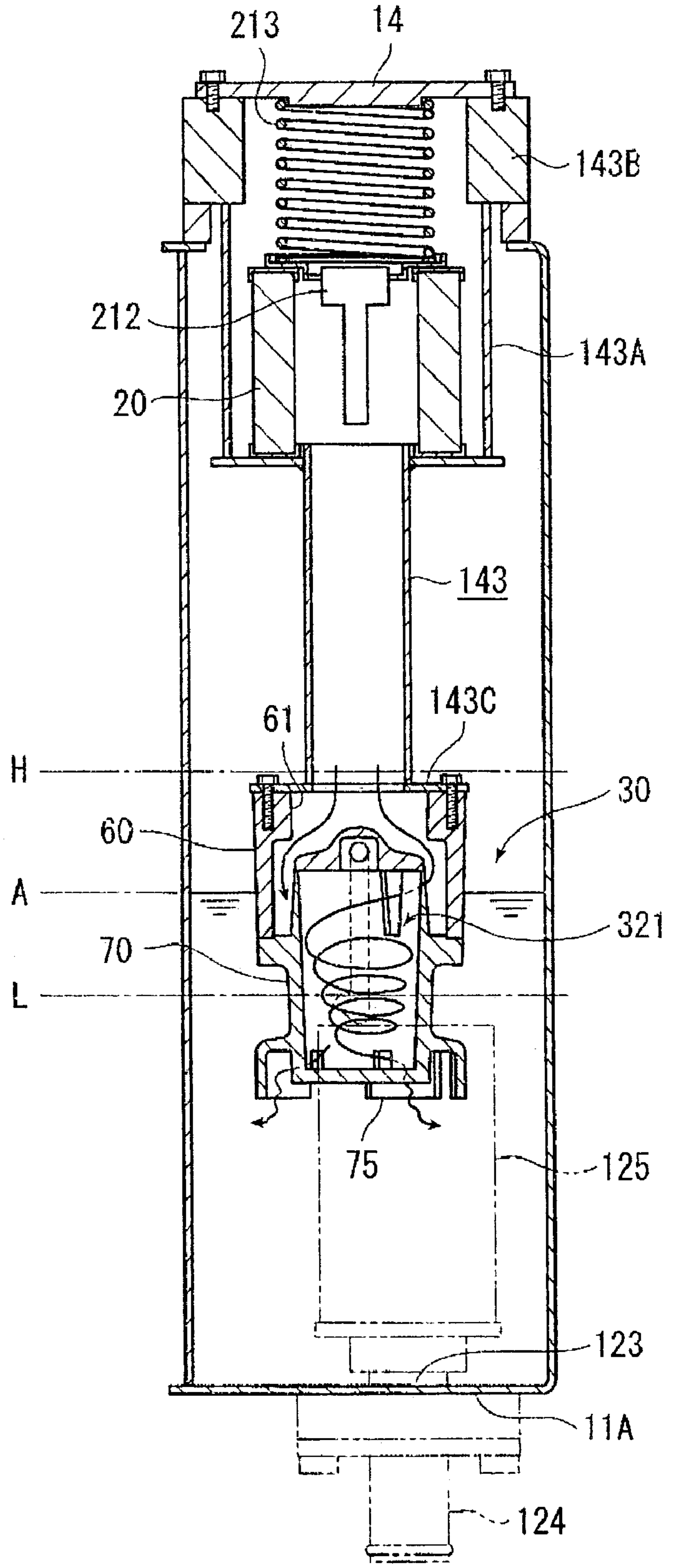
FIG. 7 is a schematic cross sectional lateral view of the third embodiment of fluid tank according to the invention.
Figure 8:
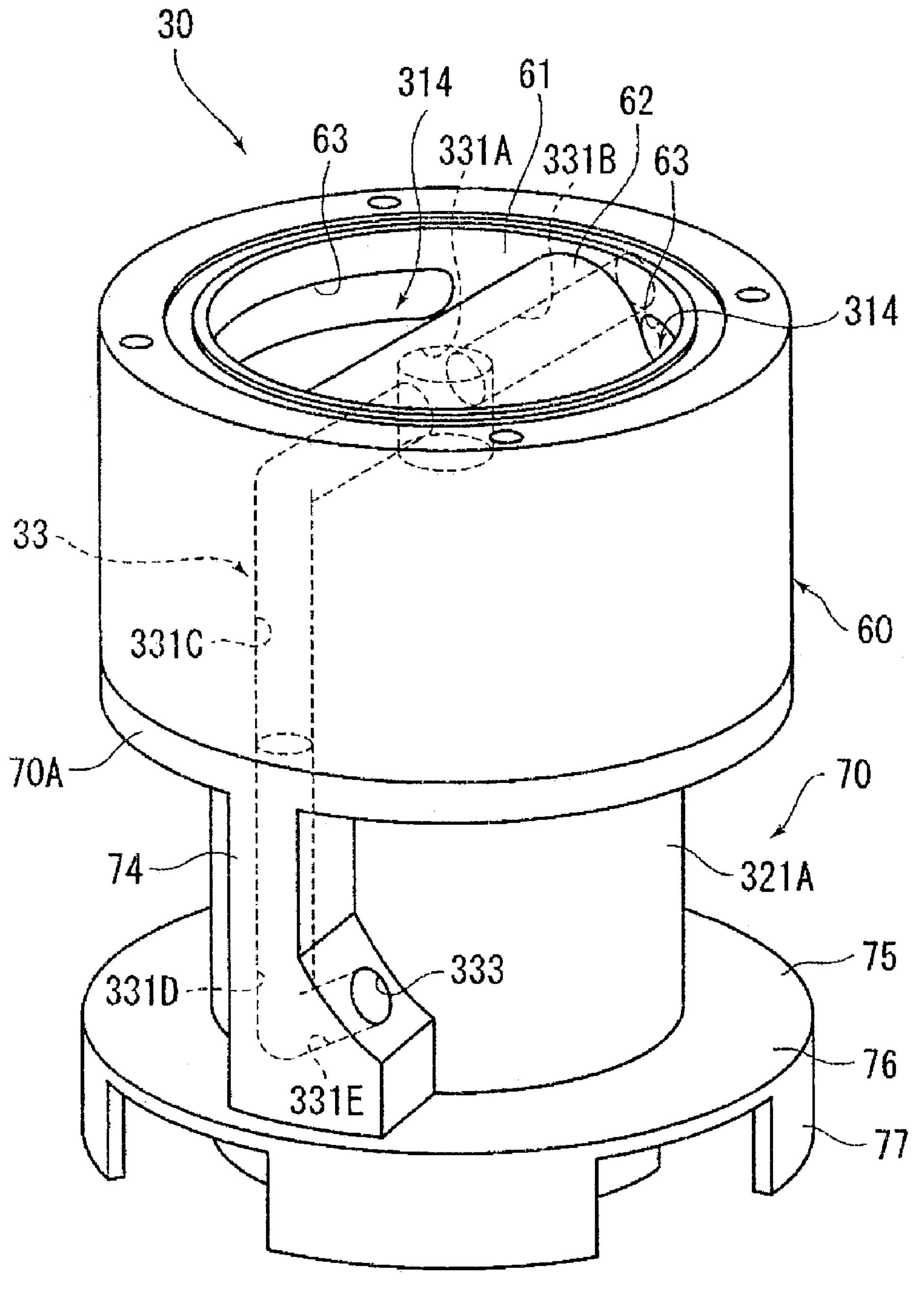
FIG. 8 is a schematic perspective view of the bubble removing device of the third embodiment.
Figure 9:
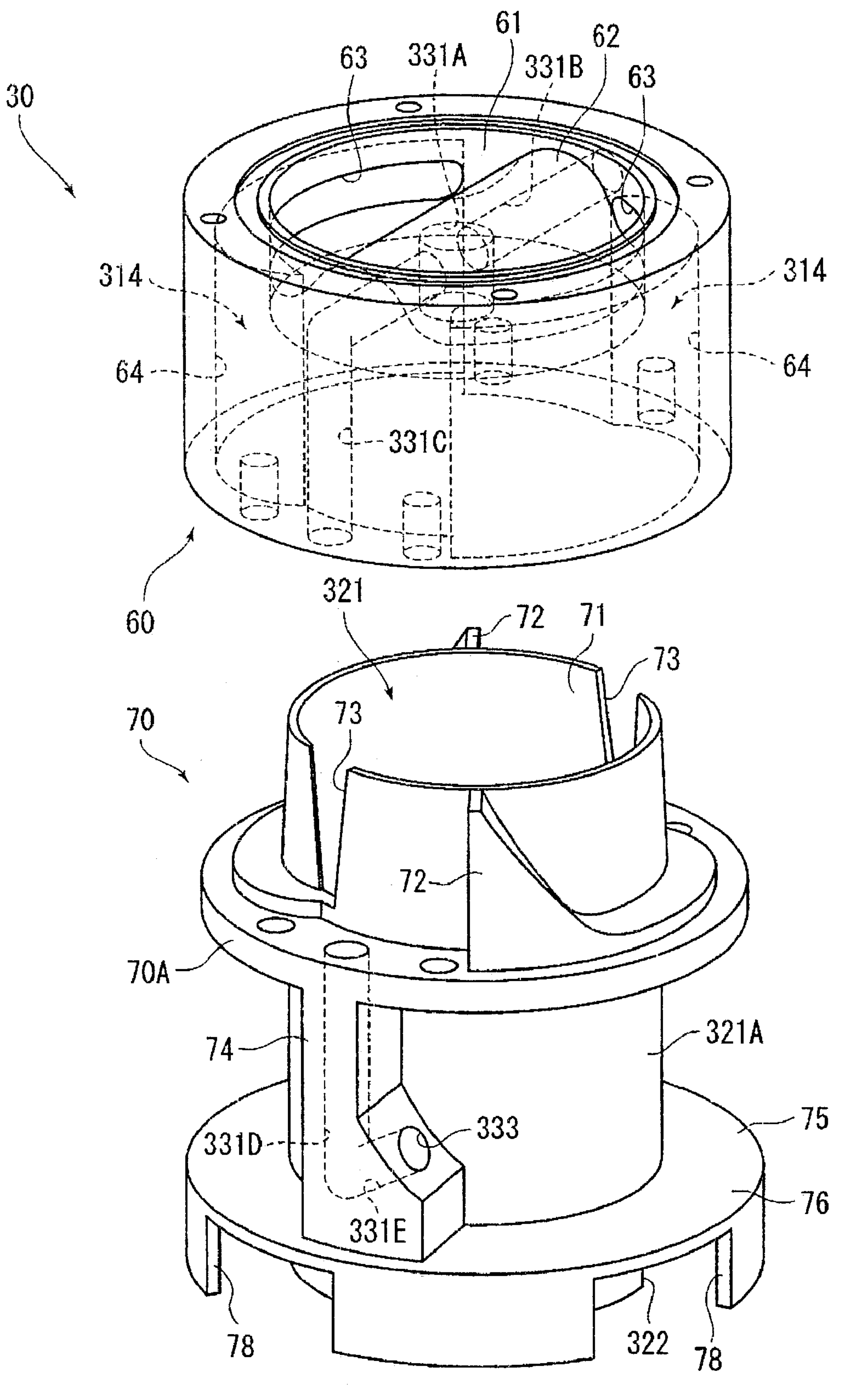
FIG. 9 is an exploded schematic perspective view of the bubble removing device of the third embodiment.
Figure 10:
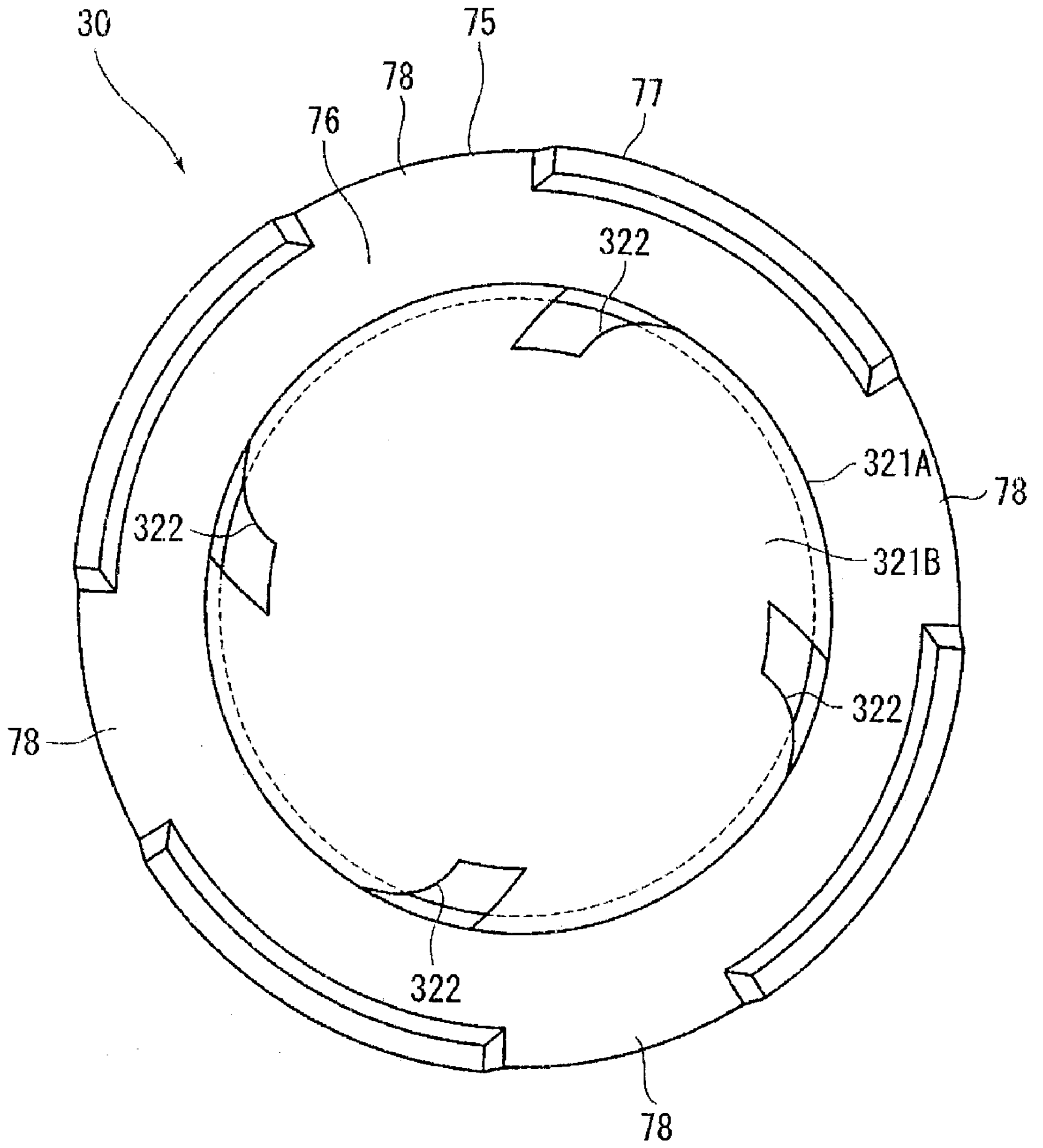
FIG. 10 is a schematic bottom view of the bubble removing device of the third embodiment.

Furthermore, this embodiment greatly differs from the first embodiment in terms of the configuration of the bubble removing device 30. FIG. 6 is a schematic cross sectional front view of the third embodiment of hydraulic tank 1 according to the invention. FIG. 7 is a schematic cross sectional lateral view of the third embodiment. FIGS. 8 through 10 respectively show a schematic perspective view, an exploded schematic perspective view and a bottom view of a principal part of the bubble removing device 30 of the embodiment.

Referring firstly to FIGS. 6 and 7, the delivery port 123 for delivering hydraulic fluid to the pump is fitted to the bottom plate 11A of the hydraulic tank 1 and accordingly the joint member 124 and the strainer 125 are vertically arranged. The bubble removing device 30 is arranged not right above the strainer 125 (the delivery port 123) but at a laterally displaced position and the lower end of the bubble removing device 30 is located slightly below the upper end of the strainer 125. The bubble exhaust port 333 of the bubble removing device 30 is located at a position remote from the strainer 125 so that bubbles coming out from the exhaust port 333 will hardly be drawn into the strainer 125.

Referring to FIGS. 6 through 10, the bubble removing device 30 is of a type that does not have a central core section 311 (see FIG. 1) unlike its counterpart of the first embodiment. The hydraulic fluid coming from the hollow section of the cylindrical filter 20 flows into an upper central part of the bubble removing device 30 of this embodiment.

The bubble removing device 30 has a first member 60 rigidly secured to the lower surface of the lower flange 143C arranged at the vertical pipe 143 by means of bolts and a second member 70 rigidly secured to the lower end of the first member 60 by means of bolts. An upper part of the second member 70 is contained in the first member 60.

The first member 60 has a hollow cylindrical form and a downwardly recessed hydraulic fluid input port 61 is formed at the top thereof. A ridge-shaped flow direction changing section 62 is standing upward from the top surface of the input port 61 that is found within the first member 60. The flow direction changing section 62 has a smooth and curved surface so that the hydraulic fluid flowing down to the input port 61 from above is divided by it into two branches, which flow in two different directions. A pair of oppositely-disposed horizontally oblong lateral openings 63 is formed at the inner peripheral surface of the input port 61 so that the two flows of hydraulic fluid formed by the flow direction changing section 62 are respectively led into the lateral openings 63. Additionally, a pair of recessed inlet flow path forming sections 64 is arranged at the inner peripheral surface of the hollow part of the first member 60 in such a way that the lateral wall of the first member 60 is thinned by the inlet flow path forming sections 64. The inlet flow path forming sections 64 communicate with the respective lateral openings 63.

On the other hand, the second member 70 has a bottomed hollow cylindrical form and is provided at an upper part thereof with an upwardly projecting inlet flow path forming wall 71. A pair of oppositely-disposed guide sections 72 is projecting from the outer peripheral surface of the inlet flow path forming wall 71. As the inlet flow path forming wall 71 is driven into the hollow part of the first member 60, the guide sections 72 come into engagement with the respective inlet flow path forming sections 64 of the first member 60. Thus, a pair of inlet flow paths 314 for leading hydraulic fluid into the cyclone chamber 321 is produced by the spaces defined by the inlet flow path forming sections 64, the inlet flow path forming wall 71 and the guide sections 72 so that hydraulic fluid flows into the inlet flow paths 314 by way of the lateral openings 63 of the first member 60. The guide sections 72 respectively have steeply inclined surfaces running downward from the top and, as the inclined surfaces come close to the bottom, they become mildly sloped and then substantially flat to show a small height until they get to corresponding inflow ports 73, which are formed as notches of the inlet flow path forming wall 71. Thus, the hydraulic fluid that flows into the inlet flow paths 314 is forced to flow peripherally by the sloped surfaces and led to the inflow ports 73 so as to tangentially flow into the cyclone chamber 321.

Meanwhile, the first member 60 is provided with a horizontal hole section 331B formed at a position corresponding to the flow direction changing section 62, which horizontal hole section 331B communicates with the exit port 331A. A vertical hole section 331C is formed in a part of the cylindrical wall of the first member 60 that has a large wall thickness and communicates with the horizontal hole section 331B at an end of the latter. The other end of the horizontal hole section 331B is closed by a plug or the like.

On the other hand, the second member 70 is provided on the outer peripheral surface section 321A with a vertical projecting section 74 that extends from the top to the bottom of the second member 70. A vertical hole section 331D that extends downward from mount flange 70A of the second member 70 and an inclined hole section 331E that is linked to the lower end of the vertical hole section 331D and extends upward are bored in the projecting section 74. When the first and second members 60, 70 are put together, the vertical hole section 331D of the second member 70 and the vertical hole section 331C of the first member 60 come to communicate with each other at the top of the former. The other end of the inclined hole section 331E is open and operates as exhaust port 333 for bubbles.

The hole sections 331A through 331E form the exhaust flow path 33 for bubbles. Thus, the exhaust flow path 33 is found entirely within the bubble removing device 30 and hence this embodiment does not have any external flow path like the external flow path 332 of the first embodiment that is made of a tube (see FIGS. 2 and 3).

A momentum reducing section 75 that projects outward in a radial direction is arranged at a lower part of the second member 70. The momentum reducing section 75 is arranged in such a way that it covers the outflow ports 322. It has a continuous collar section 76 projecting outward from the peripheral surface section 321A and a downwardly projecting section 77 projecting downwardly from the peripheral edge of the collar section 76. A plurality of (four in this embodiment) notches 78 are formed in the downwardly projecting section 77 and arranged at regular intervals. More specifically, as shown in FIG. 10, a plurality of (four in this embodiment) notches 78 are formed at positions offset from the respective outflow ports 322 so that the hydraulic fluid flowing out from the outflow ports 322 does not spread through the notches 78 but hits the downwardly projecting section 77 to partly lose its momentum before spreading in the hydraulic tank 1 from the notches 78 and the downwardly projecting section 77. In this embodiment, the outflow ports 322 are made to show a profile extending in the swirling direction of hydraulic fluid in the cyclone chamber 321 and extend from the peripheral surface section 321A and the end facet section 321B (see FIG. 10). Thus, hydraulic fluid can flow out from the cyclone chamber 321 without disturbing the flow and reliably hit the downwardly projecting section 77 to partly lose its momentum. Note that, in addition to the momentum reducing section 75 integrally fitted to the bubble removing device 30, another such member may be fitted to the inner peripheral surface of the hydraulic tank 1.

This embodiment has a configuration different from those of the first and second embodiments and provides the following advantages.

(19) Since the bubble removing device 30 is provided with a momentum reducing section 75 for reducing the momentum of hydraulic fluid immediately after coming out from the outflow ports 322, the surface of hydraulic fluid flowing out from the outflow ports 322 would not swell up significantly nor splash up like a fountain due to the momentum of hydraulic fluid. Thus, waves would not appear on the fluid surface to trap air from immediately above the fluid surface. In other words, bubbles would not be produced so that the existing bubbles can be removed efficiently and reliably.

(20) All the exhaust flow path 33 for exhausting bubbles is found within the bubble removing device 30 and the device 30 does not have any external flow path 322 (see FIGS. 2 and 3) unlike the first embodiment. Therefore, this embodiment does not need any separate tube, for forming such an external flow path 322 so that both the number of components to be assembled and the number of assembling steps can be reduced to lower the manufacturing cost.

(21) The input port 61 arranged at the first member 60 of the bubble removing device 30 is provided with a flowing direction changing section 62 so that the flow of hydraulic fluid entering a central part of the first member 60 is reliably divided into two branches that are directed to different directions and hence hydraulic fluid can be introduced smoothly into the inlet flow paths 314.

[Modifications to the Embodiments]

The present invention is by no means limited to the above described embodiments and may be embodied in many different ways. Additionally, the above embodiments may be modified in a manner as described below.

For instance, a filter containing section 143A is arranged above the vertical pipe 143 so as to be separable from the closure member 14 in the second and third embodiments. Therefore, the filter 20 can be replaced from above simply by opening the closure member 14. However, the present invention is not limited to such an arrangement.

Figure 11:
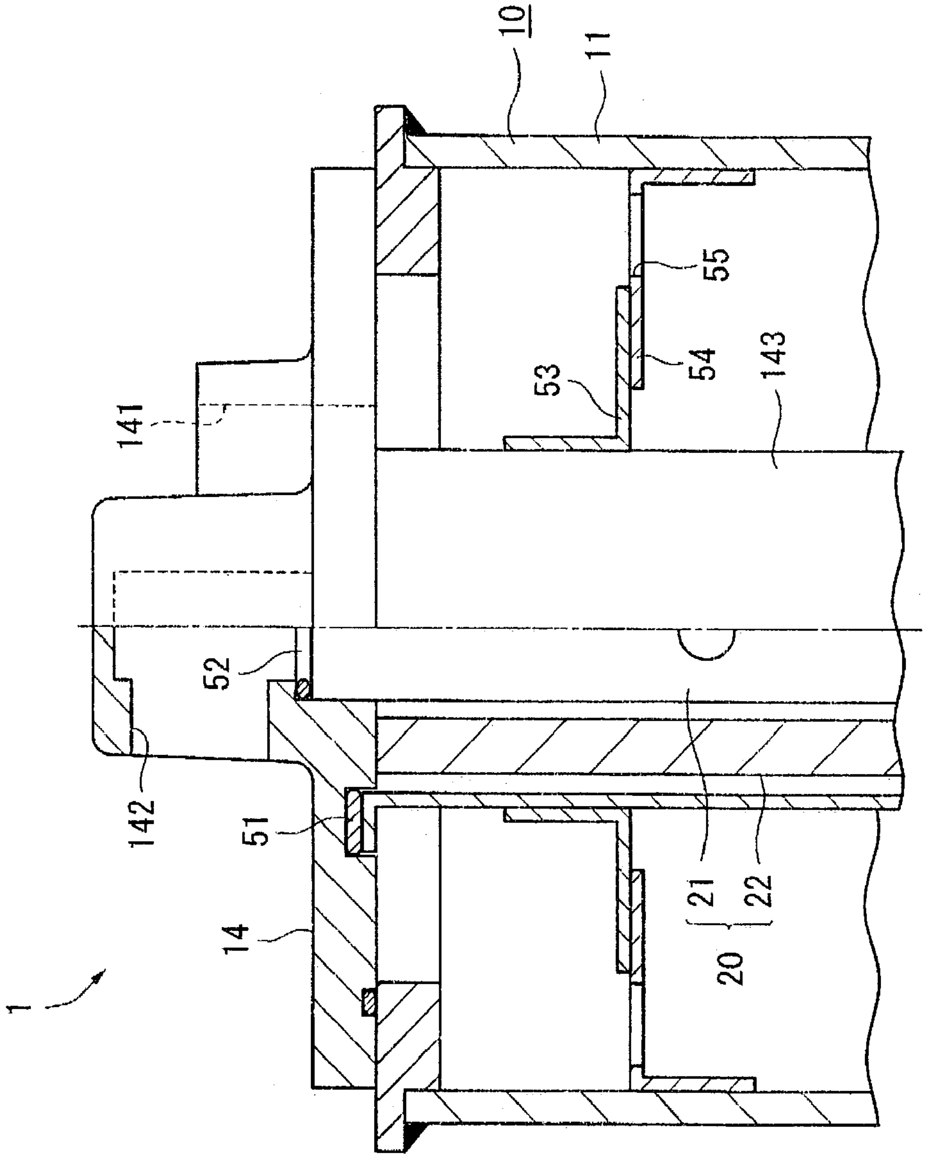
FIG. 11 is a schematic cross sectional view of the container pipe according to the invention, showing a modified fitting section thereof.

For example, the vertical pipe 143 may be made separable from the closure member 14 and supported by the tank main body 10 as shown in FIG. 11.

As shown in FIG. 11, the closure member 14 and the vertical pipe 143 are provided as separate members and the top end of the vertical pipe 143 abuts the lower surface of the closure member 14 with an annular seal member 51 interposed between them. Additionally, the core member 21 of the filter 20 is made to simply abut the closure member 14 with a seal member 52 interposed between them. In other words, the core member 21 is not forcibly driven into the closure member 14 unlike the first embodiment. Furthermore, an annular outward flange section 53 is provided between the upper end and the lower end of the vertical pipe 143 and placed on an inward flange section 54 fitted to the inner peripheral wall of the cylindrical body 11. The inward flange section 54 is provided with apertures 55 or notches having an appropriate profile for allowing supplied hydraulic fluid to flow down.

With the above arrangement, the returned hydraulic fluid is filtered as it is made to flow from inside toward outside in the filter 20. Then, again, the core member 21 and the element 22 in the vertical pipe 143 can be taken out by removing the closure member 14 so that they can be replaced without an operation of dismounting the bubble removing device 30 and mounting it back.

While the exhaust port 333 for expelling bubbles is exposed to the hydraulic fluid stored in the hydraulic tank so that the exhaust port 333 itself functions as an anti-backflow section in the first embodiment, a check valve that operates as an anti-backflow section may alternatively be arranged at the side of the exhaust port 333 as in the case of the second embodiment. With this arrangement, any gas can be completely prevented from flowing back.

However, it should be noted that such an anti-backflow section is not an indispensable component of a fluid tank according to the invention and therefore it may be provided only when necessary.

The tank main body 10, the filter 20 and the bubble removing device 30 are not limited to those described above by referring to the preferred embodiments particularly in terms of specific profile and configuration. In other words, the above described ones may be modified appropriately so long as such modified ones also serve to achieve the object of the present invention.

For example, the filter and the bubble removing device 30 of each of the above described embodiments are contained in the hydraulic tank 1, an arrangement where the filter 20 is installed outside the hydraulic tank 1 may also be found within the scope of the present invention.

The strainer 125 of each of the above described embodiments may be provided only if necessary. In other words, it may be omitted depending on the structure of the hydraulic tank 1. However, if a strainer 125 is not provided, it is desirable that the bubble removing device 30 is arranged near, preferably immediately above, the delivery port 123. To the contrary, if a strainer 125 is provided, it is desirable that the bubble removing device 30 is arranged near, preferably immediately above, the strainer 125. Then, the delivery port 123 may be disposed at any appropriate position.

Differently stated, the bubble removing device 30 is preferably located immediately above the delivery port 123 or the strainer 125 from the viewpoint of flow of hydraulic fluid, the above described advantage of (5) can be obtained if the bubble removing device 30 is located not immediately above but near the delivery port 123 or the strainer 125 so long as the flow of hydraulic fluid is not blocked.

The guide section 128 of the first embodiment and the guide section 129 of the second embodiment operate to guide the hydraulic fluid coming out from the bubble removing device 30 toward the strainer 125. However, the guide section of a fluid tank according to the invention is not limited thereto.

Figure 12:
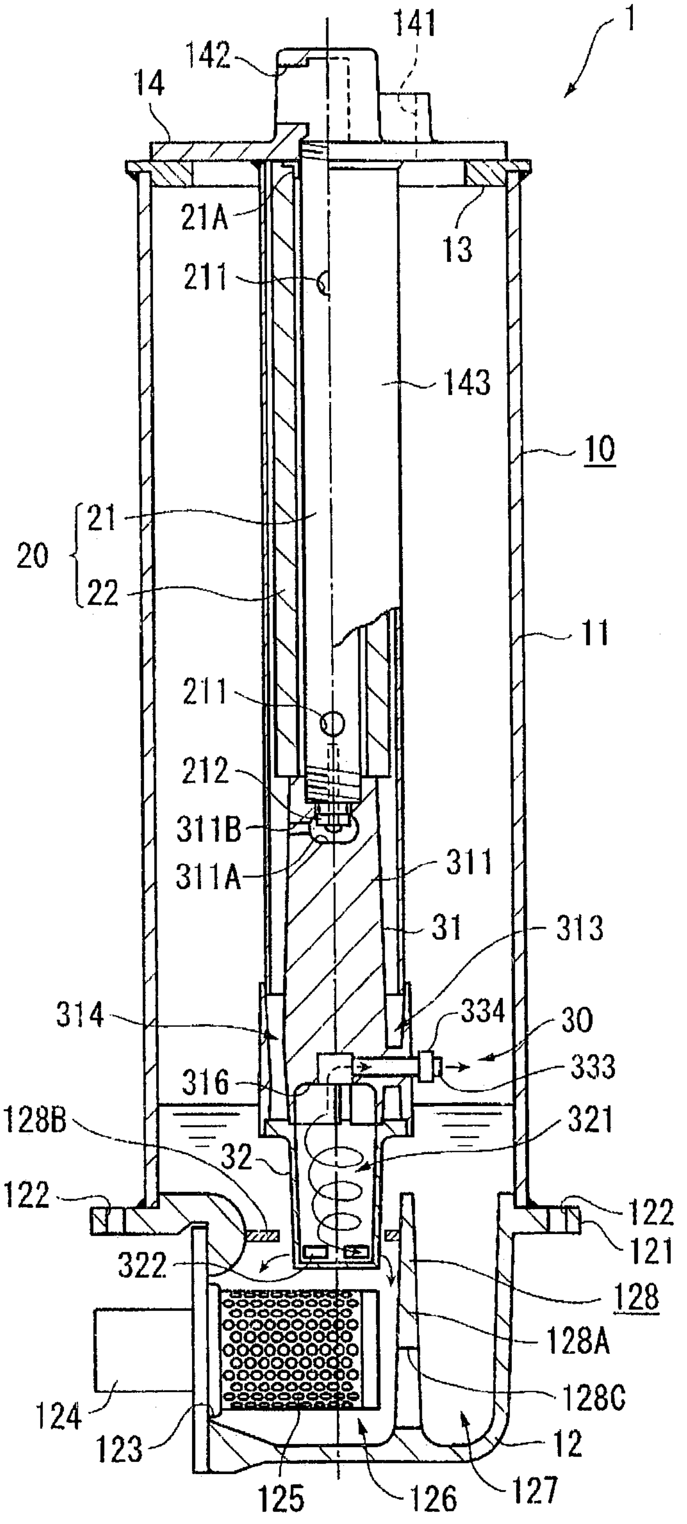
FIG. 12 is a schematic cross sectional view of a modified guide section according to the invention.
Figure 13A:
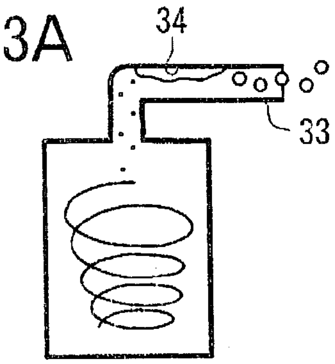
FIGS. 13A through 13H are schematic illustrations of modified combining area sections according to the invention.
Figure 13B:
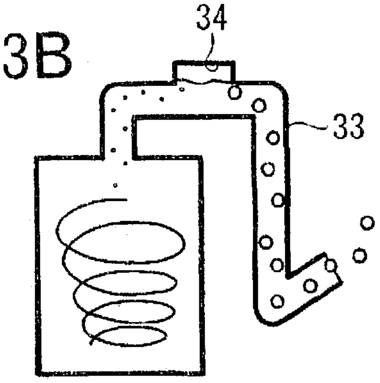
Figure 13C:
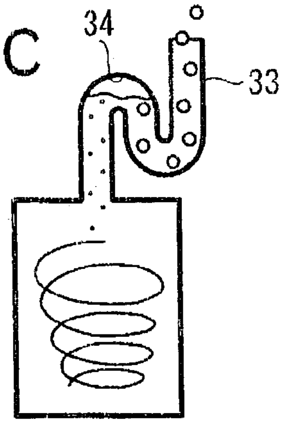
Figure 13D:
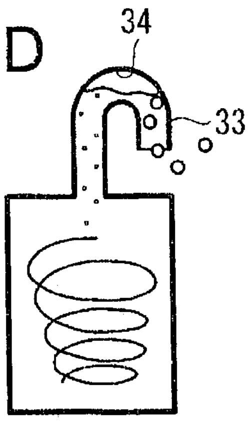
Figure 13E:
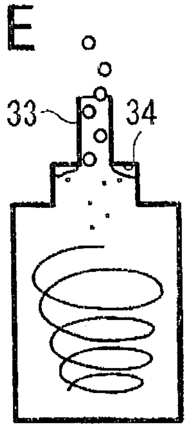
Figure 13F:
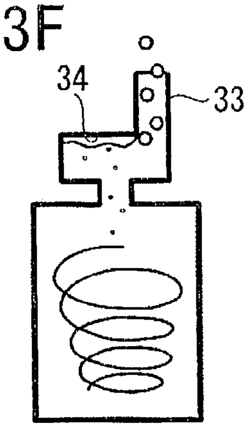
Figure 13G:
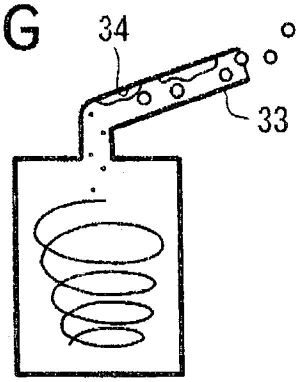
Figure 13H:
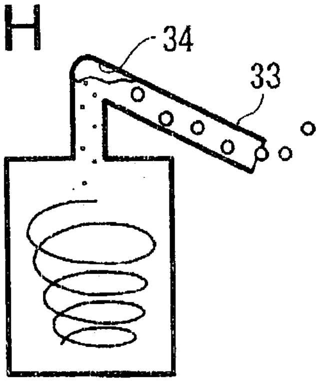
Figure 14A:
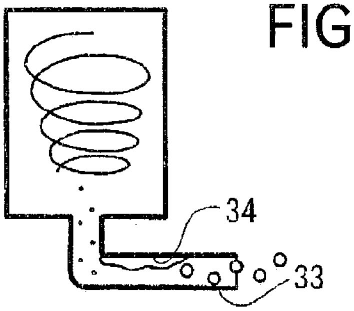
FIGS. 14A through 14I are schematic illustrations of modified combining area sections according to the invention.
Figure 14B:
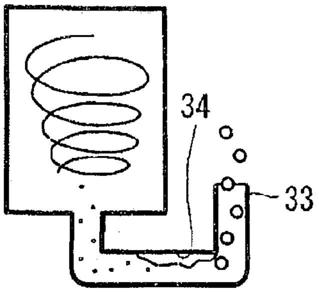
Figure 14C:
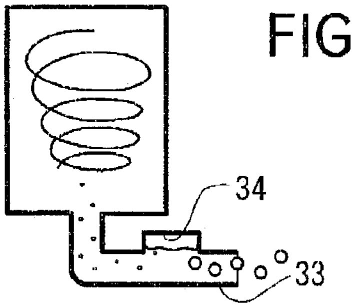
Figure 14D:
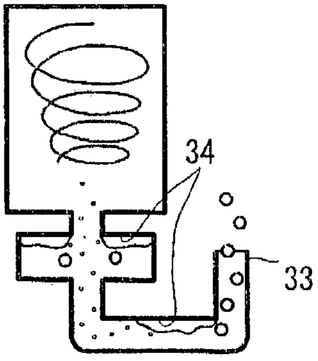
Figure 14E:
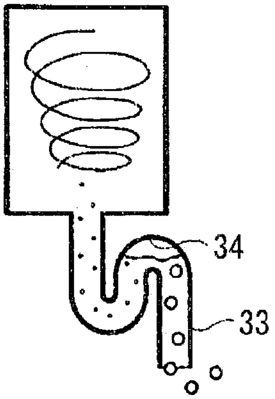
Figure 14F:
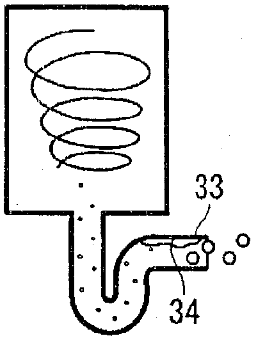
Figure 14G:
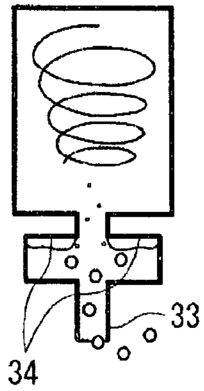
Figure 14H:
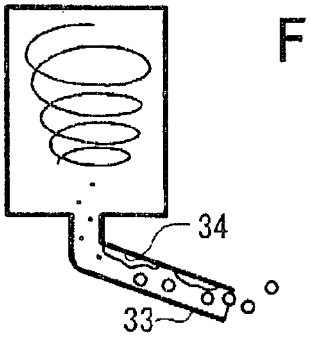
Figure 14I:
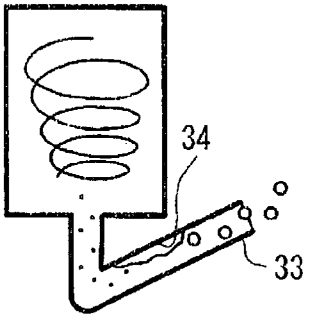

For instance, FIG. 12 shows a guide section 128 that can also be used for the purpose of the invention. The guide section 128 of FIG. 12 includes a partitioning section 128A operating as partition separating the feeding space 126 and the drain space 127 and another partitioning section 128B formed integrally with the oil receiving member 12 and arranged above the outflow ports 322 of the bubble removing device 30 substantially in parallel with the fluid surface. A communication hole 128C is formed at a lower part of the partitioning section 128A so as to allow the feeding space 126 and the drain space 127 to communicate with each other. With this arrangement, the exhaust port 333 is constantly exposed to air as in the case of the second embodiment and provided at a position near the front end thereof with an anti-backflow section 334 such as check valve.

With this arrangement, again, as in the case of the second embodiment, the hydraulic fluid from which bubbles are removed is guided by the partitioning sections 128A and 128B so as to flow out toward the strainer 125. The removed bubbles are driven off into the atmosphere through the anti-backflow section 334 and the exhaust port 333. When a large volume of hydraulic fluid is required, hydraulic fluid is mainly supplied to the strainer 125 from, a lower part of the drain space 127 by way of the communication hole 128C because the upper part of the feeding space 126 is partitioned by the other partitioning section 128B so that any vortex is prevented from being generated at the fluid surface. Unlike the first embodiment, the removed bubbles are driven off into the atmosphere from the fluid surface by way of the exhaust port 333 so that they would not be mixed with the hydraulic fluid in the drain space 127. Therefore, hydraulic fluid of good quality is constantly guided to the strainer 125.

While the strainer 125 and the delivery port 123 are arranged rectangularly relative to the axis of the bubble removing device 30 in each of the first and second embodiments, the present invention is by no means limited to such an arrangement. For example, the delivery port 123 may be arranged right below the bubble removing device 30 and the strainer 125 may be aligned with the filter 20 and the cyclone chamber 321. If such an arrangement is adopted, the strainer side guide 129B may be omitted from the second embodiment and the cyclone side guide 129A may be made to cover the outflow ports 322 and also an upper part of the strainer 125 located near the fluid surface. With this arrangement, the cyclone side guide 129A guides the hydraulic fluid from which bubbles are removed toward the strainer 125 and, when a large volume of hydraulic fluid is needed, hydraulic fluid is drawn from the lower end of the cyclone side guide 129A so that any vortex is prevented from being generated at the fluid surface as in the case of the second embodiment.

A bubble combining area section 34 extending over the exit port 331A of the exhaust flow path 33 of the bubble removing device 30, the horizontal hole section 331B and the horizontal section 332A is provided in each of the first and second embodiments. However, the location of the bubble combining area section 34 may be defined appropriately as shown in FIGS. 13A through 13H and FIGS. 14A through 14I, taking the profile and the position of the exhaust flow path 33 into consideration. Note that, while the inflow port (lower opening) through which hydraulic fluid flows into the cyclone chamber and the outflow port through which hydraulic fluid flows out from the cyclone chamber are omitted from each of the figures, they are actually provided at respective positions that are basically the same as those of each of the above described embodiments. In each of the arrangements shown in FIGS. 14A through 14I, bubbles are driven out from the bottom side end facet section of the cyclone chamber. The bubble combining area section 34 illustrated in each of FIGS. 13B, 13C, 13D, 13H, 14C and 14E is particularly effective for positively forming a bubble combining zone.

Although not shown, the exhaust flow path 33 in which the bubble combining area section 34 is formed is not limited to have an exhaust port 333 that is exposed to the hydraulic fluid contained in the hydraulic tank. It may alternatively have an exhaust port 333 that is exposed to the gas contained in the hydraulic tank 1. For example, the exhaust flow path 33 may have a profile as shown in FIG.

13C and the front end thereof may be extended further upward so that the exhaust port 333 (the reference symbol thereof is omitted in the figure) is exposed to the air. With such an arrangement, bubbles that have been grown in the exhaust flow path 33 can be smoothly driven upward from the inside of the exhaust flow path 33 and driven off into the atmosphere.

While fluid is hydraulic fluid to be used in the hydraulic system of a construction machine in each of the above described embodiments, fluid that is used in a fluid tank according to the invention is not limited to hydraulic fluid, and water or any other fluid may be used with a fluid tank according to the invention. As a matter of course, a fluid tank according to the invention may be applied not only to a hydraulic system but also to a waste fluid storage system or a waste fluid cleaning system having a waste fluid tank a fuel injection system for feeding fuel to be injected from a fuel tank under pressure or some other system.

Thus, the best mode and the best process of carrying out the present invention are disclosed in the above description. However, the present invention is by no means limited thereto. In other words, while the present invention is described by referring to the accompanying drawings that specifically illustrate preferred embodiments of the invention, those skilled in the art may be able to modify or alter any of the above described embodiments in terms of the profile and the material of each member or component as well as the number of identical components without departing from the technological concept and the scope of the present invention.

The above description limiting the profile, the material and so on of each member or component is given simply as an example that may facilitate understanding of the present invention and does not limit the present invention. Therefore, the descriptions given by using the denominations of members and components without limiting the profile and/or the material are also found within the scope of the present invention.

What is claimed is:

1. A fluid tank comprising:

a bubble removing device provided inside the tank to remove bubbles contained in fluid that flows through the bubble removing device, said bubble removing device comprising:

a cyclone chamber for generating a swirling current in the fluid flowing therethrough to separate bubbles from the fluid;

at least one outflow port through which the fluid from which the bubbles have been separated flows from the cyclone chamber; and an exhaust port through which the bubbles separated from the fluid are driven from the cyclone chamber;

wherein the cyclone chamber includes a cylindrical peripheral surface section and an end face section closing an end of the peripheral surface section, and wherein the at least one outflow port is provided along the end face section near an outer periphery thereof.

2. The fluid tank according to claim 1, further comprising:

a delivery port through which the fluid from which the bubbles have been separated flows from the fluid tank;

a strainer fitted to the delivery port; and at least one guide section for guiding the fluid from which the bubbles have been separated toward the strainer;

wherein the at least one guide section covers at least a periphery of the at least one outflow port and at least a part of the strainer located near a surface of the fluid in the tank.

3. A fluid tank comprising:

a bubble removing device provided inside the tank to remove bubbles contained in fluid that flows through the bubble removing device, said bubble removing device comprising:

a cyclone chamber for generating a swirling current in the fluid flowing therethrough to separate bubbles from the fluid;

at least one outflow port through which the fluid from which the bubbles have been separated flows from the cyclone chamber; and an exhaust port through which the bubbles separated from the fluid are driven from the cyclone chamber;

wherein the exhaust port opens into fluid contained in the fluid tank.

4. The fluid tank according to claim 3, further comprising a momentum reducing section provided outside the at least one outflow port;

wherein the fluid flowing out through the at least one outflow port impacts the momentum reducing section such that a momentum of the fluid flowing out through at least one outflow port is reduced.

5. The fluid tank according to claim 3, further comprising:

a delivery port through which the fluid from which the bubbles have been separated flows from the fluid tank;

a strainer fitted to the delivery port; and at least one guide section for guiding the fluid from which the bubbles have been separated toward the strainer;

wherein the at least one guide section covers at least a periphery of the at least one outflow port and at least a part of the strainer located near a surface of the fluid in the tank.

6. The fluid tank according to claim 4, further comprising:

a delivery port through which the fluid from which the bubbles have been separated flows from the fluid tank;

a strainer fitted to the delivery port; and at least one guide section for guiding the fluid from which the bubbles have been separated toward the strainer;

wherein the at least one guide section covers at least a periphery of the at least one outflow port and at least a part of the strainer located near a surface of the fluid in the tank.

7. A fluid tank comprising:

(i) a bubble removing device provided inside the tank to remove bubbles contained in fluid that flows through the bubble removing device, said bubble removing device comprising:

a cyclone chamber for generating a swirling current in the fluid flowing therethrough to separate bubbles from the fluid;

at least one outflow port through which the fluid from which the bubbles have been separated flows from the cyclone chamber; and an exhaust port through which the bubbles separated from the fluid are driven from the cyclone chamber; and (ii) at least one breather to maintain a pressure in the fluid tank to be substantially equal to atmospheric pressure, the breather comprising a pair of intake and exhaust valves.

8. The fluid tank according to claim 7, further comprising:

a delivery port through which the fluid from which the bubbles have been separated flows from the fluid tank;

a strainer fitted to the delivery port; and at least one guide section for guiding the fluid from which the bubbles have been separated toward the strainer;

wherein the at least one guide section covers at least a periphery of the at least one outflow port and at a part of the strainer located near a surface of the fluid in the tank.

9. The fluid tank according to claim 1, further comprising:

a delivery port through which the fluid from which the bubbles have been separated flows from the fluid tank; and a strainer fitted to the delivery port;

wherein the exhaust port of the bubble removing device is located at a position separated from at least one of the delivery port and the strainer.

10. The fluid tank according to claim 1, wherein the outflow port of the bubble removing device has a profile extending in a swirling direction of the swirling current in the cyclone chamber.

11. The fluid tank according to claim 1, wherein the bubble removing device further comprises:

a pair of inlet flow paths for leading the fluid into the cyclone chamber; and a flow direction changing section for dividing the fluid into the cyclone chamber; and a guide section having an include surface running downward from one end side toward another end side thereof along a peripheral direction of the cyclone chamber in the inlet flow path.

12. The fluid tank according to claim 1, further comprising:

an inlet flow path provided on an outer peripheral side of the cyclone chamber of the bubble removing device for leading the fluid into the cyclone chamber; and a guide section having an inclined surface running downward from one end side toward another end side thereof along a peripheral direction of the cyclone chamber in the inlet flow path.

13. The fluid tank according to claim 3, further comprising:

a delivery port through which the fluid from which the bubbles have been separated flows from the fluid tank; and a strainer ftted to the delivery port;

wherein the exhaust port of the bubble removing device is located at a position separated from at least one of the delivery port and the strainer.

14. The fluid tank according to claim 3, wherein the exhaust port of the bubble removing device is directed upward.

15. The fluid tank according to claim, wherein the bubble removing device further comprises:

a pair of inlet flow paths for leading the fluid into the cyclone chamber; and a flow direction changing section for dividing the fluid flowing toward the cyclone chamber from above into the pair of inlet flow paths.

16. The fluid tank according to claim 3, further comprising:

and inlet flow path provided on an outer peripheral side of the cyclone chamber of the bubble removing device for leading the fluid into the cyclone chamber; and a guide section having an incline surface running downward from one end side toward another end side thereof along a peripheral direction of the cyclone chamber in the inlet flow path.

17. The fluid tank according to claim 7, further comprising:

a delivery port through which the fluid from which the bubbles have been separated flows from the fluid tank; and a strainer fitted to the delivery port;

wherein the exhaust port of the bubble removing device is located at a position separated from at least one of the delivery port and the strainer.

18. The fluid tank according to claim 7, wherein the bubble removing device further comprises:

a pair of inlet flow paths for leading the fluid into the cyclone chamber; and a flow direction changing section for dividing the fluid flowing toward the cyclone chamber from above into the pair of inlet flow paths.

19. The fluid tank according to claim 7, further comprising:

an inlet flow path provided on an outer peripheral side of the cyclone chamber of the bubble removing device for leading the fluid into the cyclone chamber; and a guide section having an inclined surface running downward from one end side toward another end side thereof along a peripheral direction of the cyclone chamber in the inlet flow path.

* * * * *